(12) United States Patent
Despesse et al.

(10) Patent No.: US 12,500,526 B2
(45) Date of Patent: Dec. 16, 2025

(54) ELECTRONIC DEVICE AND METHOD FOR CONTROLLING WITH AN ADDITIONAL DEGREE OF FREEDOM AN ELECTRICAL ENERGY CONVERTER COMPRISING A PIEZOELECTRIC ELEMENT, RELATED ELECTRONIC SYSTEM FOR CONVERTING ELECTRICAL ENERGY

(71) Applicant: Commissariat à l'énergie atomique et aux énergies alternatives, Paris (FR)

(72) Inventors: Ghislain Despesse, Grenoble (FR); Mustapha Touhami, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 822 days.

(21) Appl. No.: 17/858,433

(22) Filed: Jul. 6, 2022

(65) Prior Publication Data

US 2023/0026677 A1 Jan. 26, 2023

(30) Foreign Application Priority Data

Jul. 7, 2021 (FR) ..................................... 21 07345

(51) Int. Cl.
*H02M 7/217* (2006.01)
*H02M 3/00* (2006.01)
*H10N 30/40* (2023.01)

(52) U.S. Cl.
CPC ............. *H02M 7/217* (2013.01); *H02M 3/01* (2021.05); *H10N 30/40* (2023.02)

(58) Field of Classification Search
CPC ...... H02M 7/217; H02M 7/05; H02M 7/4815; H02M 3/01; H02M 3/33584; H02M 1/0058; H10N 30/40
See application file for complete search history.

(56) References Cited

U.S. PATENT DOCUMENTS

| 2014/0334193 A1* | 11/2014 | Meyer ................... H02M 7/537 363/21.01 |
| 2020/0099297 A1 | 3/2020 | Despesse et al. |

FOREIGN PATENT DOCUMENTS

| FR | 3 086 472 A1 | 3/2020 |
| WO | WO 2020/252250 | 12/2020 |

OTHER PUBLICATIONS

French Preliminary Search Report issued Mar. 22, 2022 in French Application 21 07345 filed on Jul. 7, 2021, 3 pages (with English Translation of Categories of Cited Documents).

(Continued)

*Primary Examiner* — Emily P Pham
(74) *Attorney, Agent, or Firm* — Oblon, McClelland, Maier & Neustadt, L.L.P.

(57) ABSTRACT

This control device is configured to control a converter comprising a piezoelectric element and several switches, and capable of delivering N output voltage(s) from of E input voltage(s), E≥1, N≥1.

The control device comprises a module for controlling, during a respective resonance cycle of the piezoelectric element, switching of the switches to alternate phases at substantially constant voltage and phases at a substantially constant charge at the terminals of the piezoelectric element, each cycle comprising first and second half-cycles, a current flowing in one direction in the piezoelectric element during first half-cycle and in an opposite direction during the second half-cycle.

The number of substantially constant voltage phases during a cycle is greater than or equal to E+N+2, and each of the half-cycles comprises at least two substantially constant voltage phases.

15 Claims, 12 Drawing Sheets

(56) References Cited

OTHER PUBLICATIONS

French Preliminary Search Report issued Mar. 22, 2022 in French Application 21 07345 filed on Jul. 7, 2021, citing documents AA & AO-AP therein, 3 pages (with English Translation of Categories of Cited Documents).

* cited by examiner

PRIOR ART

PRIOR ART

PRIOR ART

PRIOR ART

ELECTRONIC DEVICE AND METHOD FOR CONTROLLING WITH AN ADDITIONAL DEGREE OF FREEDOM AN ELECTRICAL ENERGY CONVERTER COMPRISING A PIEZOELECTRIC ELEMENT, RELATED ELECTRONIC SYSTEM FOR CONVERTING ELECTRICAL ENERGY

CROSS-REFERENCE TO RELATED APPLICATIONS

This application is a U.S. non-provisional application claiming the benefit of French Application No. 21 07345, filed on Jul. 7, 2021, which is incorporated herein by reference in its entirety.

FIELD

The present invention refers to an electronic device for controlling an electrical energy converter capable of converting one or several input voltages into one or several output voltages, the converter being configured to deliver N distinct output voltage(s) from E distinct input voltage(s), and E and N each being an integer more or equal to 1. The converter includes a piezoelectric element and several switches capable of being controlled to alternate phases at substantially constant voltage at the terminals of the piezoelectric element and phases at substantially constant charge at the terminals of said piezoelectric element.

The invention also relates to an electronic system for converting electrical energy comprising such an electrical energy converter and such an electronic control device, as well as a method for controlling such an electrical energy converter.

The invention relates to the field of electronic systems for converting electrical energy, in particular those including a piezoelectric element, in particular systems for converting into direct electrical energy, that is to say direct-direct conversion systems, also called DC-DC (Direct Current-Direct Current) conversion systems, and AC-DC conversion systems, also called AC-DC (Alternating Current-Direct Current) conversion systems.

BACKGROUND

Documents FR 3 064 850 B1, FR 3 086 471 A1 and FR 3 086 472 A1 are known, as well as the thesis manuscript "Piezoelectric DC-DC converters with temporary energy storage in mechanical form" by Benjamin POLLET, a converter of electrical energy and an energy converter of the aforementioned kind.

The electrical energy converter is typically a DC-DC converter comprising a piezoelectric element, with a first switch connecting a first electrode of the piezoelectric element to a first application terminal of a first voltage, a second switch connecting said first electrode of the piezoelectric element to a first supply terminal of a second voltage, and at least a third switch connecting the first electrode to a second electrode of the piezoelectric element or to a supply terminal of a third voltage, said switches being controlled cyclically, at the main frequency of oscillation of the piezoelectric element around its preselected resonance mode with, between each closing of one of the switches, a phase in which all the switches are open. The closing of each switch takes place under an approximately zero voltage across its terminals. The second electrode of the piezoelectric element is connected to a second application terminal of the first voltage and to a second supply terminal of the second voltage and optionally to the supply terminal of the third voltage, also called third supply terminal.

In steady state, a control cycle typically comprises the following successive phases: (I) opening of all the switches; (II) closing of the first switch; (III) opening of all switches; (IV) closing of the third switch; (V) opening of all switches; and (VI) closing of the second switch.

For the control of such an electrical energy converter, a regulation strategy typically consists in regulating the output voltage to follow a desired setpoint, while ensuring zero voltage switching and synchronization with the internal current of the piezoelectric element, as described in document FR 3 064 850 B1, or in the article "*Implementation of control strategy for step-down DC-DC converter based on piezoelectric resonator*" by Mustapha TOUHAMI et al. (EPE '20 ECCE Europe, pp. 1-9).

However, a quantity representative of the output of the converter, such as the output voltage or the output power, is regulated by a switching time instant, in particular the end of phase (II) via the opening of the first switch in the aforementioned example, and the other instants of switching of the switches are deduced therefrom.

SUMMARY

The object of the invention is therefore to propose an electronic device, and an associated method, for controlling such an electrical energy converter offering improved control of the converter, in particular better regulation.

Therefore the subject of the invention is an electronic device for controlling an electrical energy converter capable of converting one or several input voltages into one or several output voltages, the converter being configured to deliver N voltage(s) of distinct output(s), from E distinct input voltage(s), E and N each being an integer greater than or equal to 1, the converter comprising a piezoelectric element and several switches, the electronic control device comprising a control module configured to control, during a respective resonance cycle of the piezoelectric element, a switching of each of the switches to alternate phases at substantially constant voltage across the terminals of the piezoelectric element and phases with a substantially constant charge at the terminals of said piezoelectric element, each resonance cycle comprising first and second half-cycles, a current flowing in a first direction in the piezoelectric element during the first half-cycle and in a second, opposite direction in the first sense, during the second half-cycle, the number of phases at substantially constant voltage during a respective resonance cycle being greater than or equal to the sum of E, N and two; and each of the first and second half-cycles comprising at least two substantially constant voltage phases.

With the electronic control device according to the invention, each respective resonance cycle then comprises an additional phase at substantially constant voltage, in comparison with the control device of the state of the art, the number $M_V$ of phases at substantially constant voltage during a respective resonance cycle being greater than or equal to N+3, i.e. $M_V \geq N+3$; with each half-cycle comprising at least two phases at substantially constant voltage, whereas with the control device of the state of the art one of the half-cycles generally comprises a single phase at substantially constant voltage.

The number of phases at substantially constant voltage during each of the first and second half-cycles, that is to say during each respective resonance half-cycle, is then greater than or equal to two. Each resonance cycle preferably consists of the first and second half-cycles. The two half-cycles are differentiated by an evolution in the opposite direction of the mechanical deformation of the piezoelectric element, or else by an evolution in the opposite direction of the internal current $I_L$ in the motional branch of the equivalent electrical model of the piezoelectric element.

This additional phase at substantially constant voltage then makes it possible to have an additional degree of freedom for its regulation, this additional degree of freedom corresponds to the duration of said additional phase. This duration is controlled for example by the end time of this level, or even by the end time of the previous level.

This additional phase then makes it possible to ensure an electrical charge balance, while controlling the energy returned to the output of the converter independently of the energy stored in the piezoelectric element.

This then typically makes it possible to store part of the energy taken from the source in the piezoelectric element when the input power is greater than the output power, and then to restore this energy at the output when the power of input is less than the output power, which makes it possible to provide a constant or quasi-constant power/voltage at the output while the power taken from the network is for example in $\sin(\omega t)^2$, without then requiring the presence of a capacitor of filtering, or at the very least by reducing the capacitance of this filtering capacitor.

The electronic control device according to the invention also makes it possible to deal with rapid variations in output power (typically due to the addition or removal of a load at the output) with a faster dynamic regulation of the voltage of output thanks to the buffer energy stored mechanically in the piezoelectric element which is then immediately available, this buffer energy being possible by said additional phase.

With the control device of the state of the art, the regulation has only one degree of freedom. During a rapid disturbance at the input and/or at the output, the energy balance cannot then be maintained, and therefore the output voltage and/or the output power cannot be maintained during this transient state.

According to other advantageous aspects of the invention, converters of control electronics includes the following electrical energy characteristics, taken in isolation or following all technically possible combinations:

the number of phases at substantially constant voltage during a respective resonance phases is equal to the sum of E, N and two;

the total number of phases at substantially constant voltage and of phases at substantially constant charge during a respective resonance cycle is greater than or equal to four plus twice the sum of E and N;

the value of the voltage of one of the voltage values substantially constant during the first half cycle is substantially equal to the value of the voltage of one of the voltage phases substantially constant during the second half cycle;

the phases at substantially constant voltage having substantially the same voltage value during the first cycle and during the second cycle are one after the other; and preferably form the same phase at substantially constant voltage extending over two successive half-cycles;

the voltage value of each of the substantially constant voltage phases is selected from the group consisting of: zero value; value of a respective input voltage; opposite of the value of a respective input voltage; value of a respective output voltage; opposite of the value of a respective output voltage; and linear combination of the above values;

the device further comprises a regulation module configured to regulate a first parameter associated with the first half-cycle and a second parameter associated with the second half-cycle; each of the first and second parameters being a variable representing a temporal end time of a phase relative to substantially constant voltage phase;

the first parameter is regulated according to a quantity representative of the output of the converter, and the second parameter is regulated according to a desired level of energy reserve or else according to the first parameter; and the first parameter is regulated via a first loop of regulation, and the second parameter is regulated via a second loop of regulation, distinct from the first loop of regulation;

the first loop regulation preferably being faster than the second loop regulation.

The invention also relates to an electronic conversion system of electrical energy including:

an electrical energy converter comprising a piezoelectric element and several switches capable of being controlled to alternate phases at substantially constant voltage across the terminals of the piezoelectric element and phases at substantially constant charge across the terminals of said piezoelectric element; and an electronic control device for controlling the electrical energy converter, the electronic control device being as defined above.

According to another advantageous aspect of the invention, the electronic system for converting electrical energy is a system for converting into a DC electrical energy, such as a DC-DC conversion system or an AC-DC conversion system.

The invention also refers to a method for controlling an electrical energy converter capable of converting one or several input voltages into one or several output voltages, the converter being configured to deliver N distinct output voltage(s) from E distinct input voltage(s), E and N each being an integer greater than or equal to 1, the converter comprising a piezoelectric element and several switches, the method being implemented by an electronic control device and comprising a control step, during a respective resonance cycle of the piezoelectric element, switching of each of the switches to alternate phases at substantially constant voltage at the terminals of the piezoelectric element and phases at substantially constant charge at the terminals of said piezoelectric element, each resonance cycle comprising first and second half-cycles, a current flowing in a first direction in the piezoelectric element during the first half-cycle and in a second direction, opposite to the first direction, during the second half-cycle, the number of phases at substantially constant voltage during a respective resonance cycle being greater than or equal to the sum of E, N and two; and each of the first and second half-cycles comprising at least two substantially constant voltage phases.

BRIEF DESCRIPTION OF THE DRAWINGS

These characteristics and advantages of the invention will appear more clearly upon reading the following description, given only as a non-limiting example, and made with reference to the appended drawings, in which.

DETAILED DESCRIPTION

In the following of the description, the expression "substantially equal to" defines a relation of equality at plus or minus 10%, preferably at plus or minus 5%.

Figure 1:
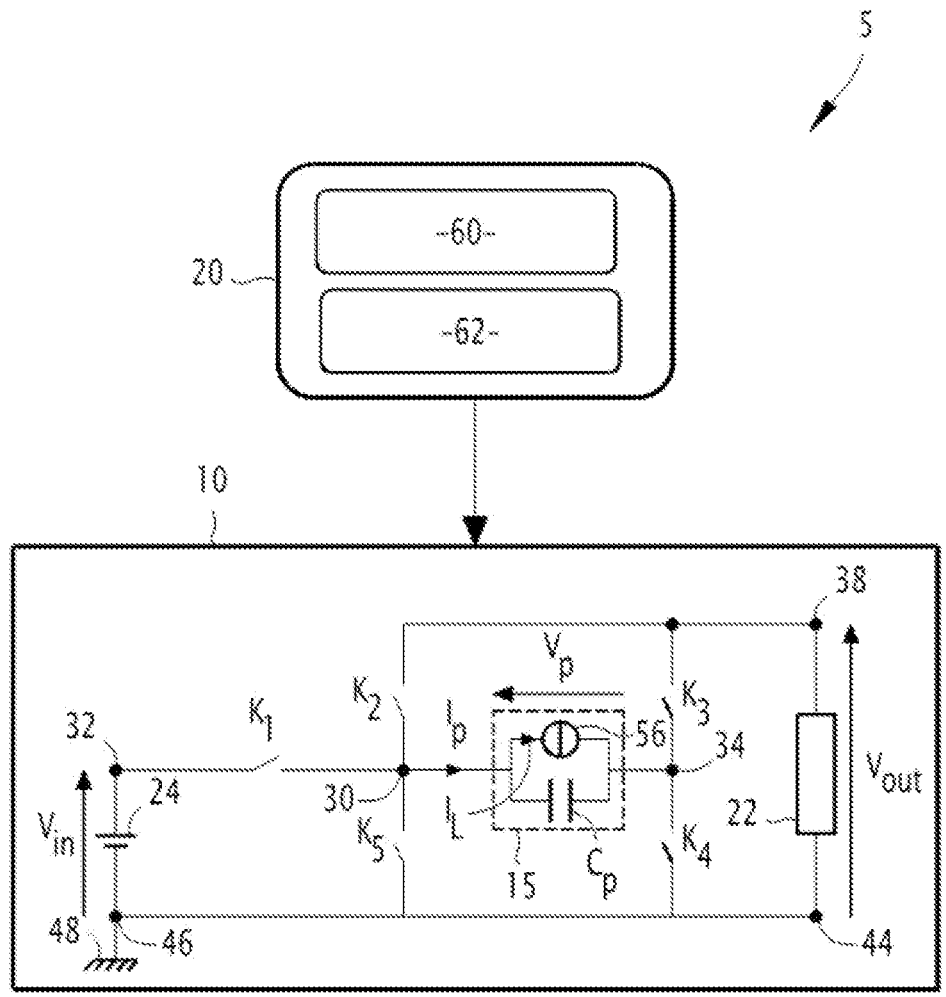
FIG. 1 is a schematic representation of an electronic system for converting electrical energy according to the invention, comprising an electrical energy converter comprising a piezoelectric element and several switches, and an electronic device for controlling the electric energy converter to control, during a respective cycle of resonance of the piezoelectric element, a switching of each of the switches to alternate phases at substantially constant voltage at the terminals of the piezoelectric element and phases at substantially constant charge at the terminals of said element piezoelectric, each resonance cycle comprising first and second half-cycles, a current flowing in a first direction in the piezoelectric element during the first half-cycle and in a second direction, opposite to the first direction, during the second half-cycle.

In FIG. 1, an electronic system for converting electrical energy 5 includes an electrical energy converter 10 comprising a piezoelectric element 15 and several switches $K_1$, $K_2$, $K_3$, $K_4$, $K_5$ able to be controlled to alternate phases at substantially constant voltage at the terminals of the piezoelectric element 15 and phases at substantially constant charge at the terminals of said piezoelectric element 15; and an electronic device 20 for controlling the electrical energy converter 10.

The electronic system for converting electrical energy 5 is typically a system for converting into a direct electrical energy, such as a direct-direct conversion system capable of converting a first energy or direct electrical voltage received at the input into a second energy or DC electrical voltage delivered at the output, or alternatively an AC-DC conversion system capable of converting an AC energy or electrical voltage received at the input into a DC electrical energy or voltage delivered at the output of the conversion system 5.

When the electrical energy conversion system 5 is an AC-DC conversion system, the electrical energy conversion system 5 preferably further comprises a voltage rectifier, not shown, connected to the input of the electrical energy converter 10 and able to rectify the AC electric voltage received at the input of the conversion system 5 to deliver a rectified electric voltage at the input of the converter 10, the electric energy converter 10 preferably will be a DC-DC converter able to convert an energy or direct electrical voltage into another continuous energy or direct electrical voltage. The voltage rectifier is for example a rectifying bridge, such as a diode bridge. Alternatively, the voltage rectifier is formed in part by switches of the converter 10.

Those skilled in the art will observe that these different examples for the conversion system 5, whether it is a DC-DC conversion system or else an AC-DC conversion system, are also recorded in the documents FR 3,086,471 A1 and FR 3,086,472 A1, in particular with regard to their FIGS. 1 to 3, 10, 15, 17 and 19 to 20.

The electrical energy converter 10 is preferably a DC-DC converter, and is also called a DC-DC converter. The DC-DC converter generally has the role of regulating a supply voltage of a load 22 to a stable value, being supplied by a power source 24 supplying a substantially continuous DC voltage. The energy source 24 is for example a battery or a solar panel.

The electrical energy converter 10 is then configured to raise the value of the DC voltage between its input and its output, and is then also called a boost DC-DC converter, or else a strongly boosting DC-DC converter; or else is configured to lower the value of the DC voltage between its input and its output, and is then called a lowering DC-DC converter, with also a variant of a strongly lowering DC-DC converter.

The electrical energy converter 10 is configured to deliver N distinct output voltage(s), from E distinct input voltage(s), E and N each being an integer greater than or equal to 1.

In the example of FIG. 1, the electrical energy converter 10 is configured to deliver an output voltage, denoted $V_{out}$, from an input voltage, denoted $V_{in}$, the number E of input voltage(s) and the number N of output voltage(s) then each being equal to 1.

In a variant not shown, the electrical energy converter 10 is configured to deliver several distinct output voltages from one or several distinct input voltages, the number N of distinct output voltages then being greater than 1. As a further variant, the electrical energy converter 10 is configured to deliver one or several distinct output voltage(s) from several distinct input voltages, the number E of distinct input voltages then being greater than 1. As a further variant, the electrical energy converter 10 is configured to deliver several distinct output voltages from several distinct input voltages, the numbers E and N then each being greater than 1. According to these variants, the input voltage or voltages are denoted $V_{ek}$ where k is an integer index associated with the input voltage and between 1 and E, and the distinct output voltage or voltages are denoted $V_{sl}$, where l is a integer index associated with the output voltage and between 1 and N.

When the electrical energy converter 10 is configured to deliver several distinct output voltages, the converter 10 is typically connected to several loads 22, as represented for example in FIG. 17 of document FR 3 086 471 A1.

Similarly, when the electrical energy converter 10 is configured to deliver one or several distinct output voltage(s) from several different input voltages, the converter 10 is then powered by several power sources 24.

The electrical energy converter 10 comprises the piezoelectric element 15, and the control device 20 is configured to cause the piezoelectric material of the piezoelectric element 15 to operate at its resonance in order to exploit charge transfer phases, making it possible to free from the use of an inductive element, while regulating the output voltage and maintaining the resonance of the piezoelectric material, that is to say with repeated switching cycles at an operating frequency depending on the frequency of resonance of the piezoelectric element 15, and by adjusting the durations of the respective switching phases within the resonance cycle.

Figure 2:
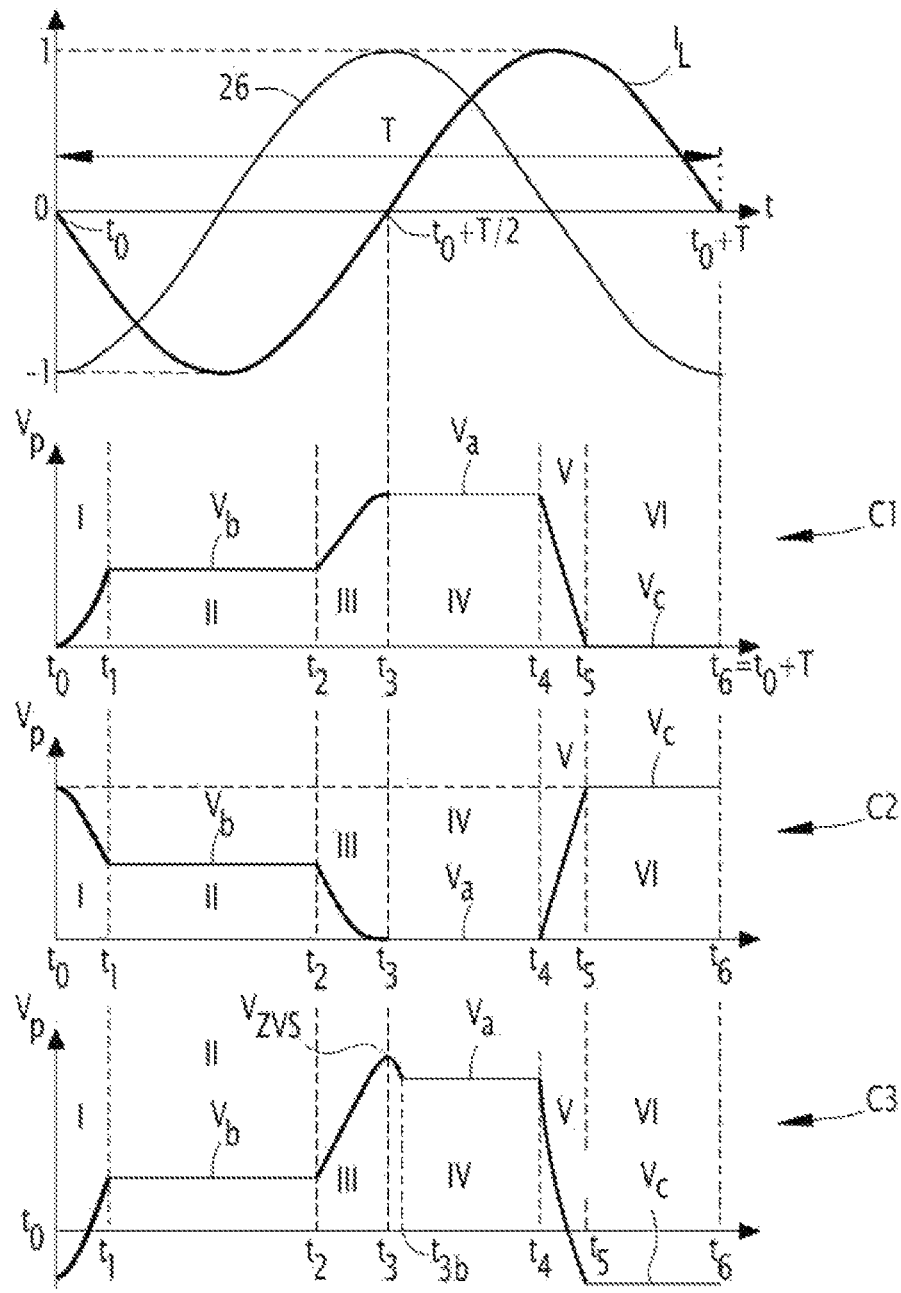
FIG. 2 is a set of curves representing a current flowing in the piezoelectric element, a mechanical deformation of the piezoelectric element, and the voltage across the terminals of the piezoelectric element for different configurations of electrical energy conversions, namely a step-down configuration (power transfer from $V_a$ to $V_b$), a step-up voltage configuration (power transfer from $V_b$ to $V_c$) and a strongly step-down configuration (power transfer from $V_a$ to $V_b$ and $V_c$); with the state-of-the-art control device.

As known per se, the mechanical oscillation of the piezoelectric element 15 is approximately sinusoidal, as represented by curve 26 in FIG. 2 illustrating the mechanical deformation of the piezoelectric element 15 during a respective resonance cycle. An increase or decrease in stored energy over a period leads to an increase or decrease in oscillation amplitude, respectively. Furthermore, during a phase with a substantially constant charge at the terminals of the piezoelectric element 15, that is to say when the piezoelectric element 15 is placed in a substantially open electrical circuit, with a weak exchange of electrical charges between the piezoelectric element 15 and the exterior, an increase in the amplitude of the oscillations generates an increase in the amplitude of oscillation of the voltage $V_p$ across the terminals of the piezoelectric element 15, and during a voltage phase substantially constant at the terminals of the piezoelectric element 15, this increase in oscillation amplitude leads to an increase in a current $I_L$ flowing in the piezoelectric element 15.

By substantially constant charge is meant an exchange of a charge with the outside which is less than 10% of the charge which would have been exchanged with the outside if the voltage had been kept constant. In other words, by substantially constant charge is meant a charge variation of less than 10% of the charge which would have been exchanged with the exterior of the piezoelectric element 15 if the voltage across the terminals of the piezoelectric element 15 had been kept constant over the time period considered.

By substantially open electrical circuit is meant a circuit in which any leakage current leads to a variation in the charge of the piezoelectric element 15 of less than 10% of the charge which would have been exchanged with the exterior of the piezoelectric element 15 if the voltage across the terminals of the piezoelectric element 15 had been kept constant over the time period considered.

By substantially constant voltage is meant a voltage variation of less than 20%, preferably less than 10%, of the input or output voltage of converter 10. By way of example, if the input voltage of converter 10 is equal to 100V, then the voltage variation during each phase at substantially constant voltage, that is to say on each level at substantially constant voltage, is less than 20% of this voltage, that is to say less than 20V; preferably less than 10% of this voltage, that is to say less than 10V.

The converter 10 then comprises several switches $K_1$, $K_2$, $K_3$, $K_4$, $K_5$ capable of being controlled to alternate phases at substantially constant voltage and phases at substantially constant charge at the terminals of the piezoelectric element 15, within periods of substantially constant duration corresponding to the operating frequency of converter 10, depending on the resonance frequency, also called natural frequency, of piezoelectric element 15. The phases with a substantially constant load make it possible, in established or permanent mode, to pass from one constant voltage to another and to close the switches which must be closed when the voltage at their terminals is preferably zero in order to have so-called zero voltage switching, also called ZVS (Zero Voltage Switching).

In the example of FIG. 1, the electrical energy converter 10 comprises five switches $K_1$, $K_2$, $K_3$, $K_4$, $K_5$, namely a first switch $K_1$, a second switch $K_2$, a third switch $K_3$, a fourth switch $K_4$ and a fifth switch $K_5$. The first switch $K_1$ then connects a first electrode 30 of the piezoelectric element 15 to a first terminal 32 for applying the input voltage $V_{in}$; the second switch $K_2$ connects the first electrode 30 of the piezoelectric element 15 to a first terminal 38 for supplying the output voltage $V_{out}$; the third switch $K_3$ connects a second electrode 34 of the piezoelectric element 15 to the first terminal 38 for supplying the output voltage $V_{out}$; the fourth switch $K_4$ connects the second electrode 34 of the piezoelectric element 15 to a second terminal 44 for supplying the output voltage $V_{out}$; and the fifth switch $K_5$ connects the first electrode 30 of the piezoelectric element 15 to a second terminal 46 for applying the input voltage $V_{in}$. In the example of FIG. 1, the second terminal 46 for applying the input voltage $V_{in}$ is connected to the second terminal 44 for supplying the output voltage $V_{out}$, these second terminals 44, 46 being themselves connected to an electrical grounding 48.

Each switch of the converter 10, namely each of the first, second, third, fourth and fifth switches $K_1$, $K_2$, $K_3$, $K_4$, $K_5$ is preferably a unidirectional current and unidirectional voltage switch, except for the in tension bidirectional switch $K_2$. Each switch $K_1$, $K_2$, $K_3$, $K_4$, $K_5$ comprises for example a transistor and an antiparallel diode intrinsic to the transistor, not shown. The transistor is, for example, an insulated-gate field-effect transistor, also called a MOSFET (Metal Oxide Semiconductor Field Effect Transistor). Alternatively, the transistor is a bipolar transistor; an insulated gate bipolar transistor, also called an IGBT (Insulated Gate Bipolar Transistor); a transistor based on silicon (Si), a transistor based on GaN (Gallium Nitride); a transistor based on silicon carbide (SiC), or a transistor based on diamond, or even a thyristor, or even a mechanical switch, such as a MEMS (MicroElectroMechanical System) micro-switch.

The piezoelectric element 15 is known per se, and is typically modeled, close to the resonance mode used, in the form of a capacitor $C_p$ and the resonant branch 56 connected in parallel with the capacitor $C_p$, the capacitor $C_p$ and the resonant branch 56 being connected between the first and second electrodes 30, 34 of the piezoelectric element. The resonant branch 56 is typically an RLC branch formed of a capacitor, a resistor and an inductor connected serially and not shown. The voltage $V_p$ at the terminals of the piezoelectric element then typically corresponds to the voltage at the terminals of the capacitor $C_p$.

Those skilled in the art will of course understand that the terminals of the piezoelectric element 15 correspond to the first 30 and second 34 electrodes of the piezoelectric element 15, and are then also denoted terminals 30, 34 of the piezoelectric element. In the present description, the terminals 30, 34 of the piezoelectric element are then identical to the electrodes 30, 34 of the piezoelectric element.

The resonance frequency is the frequency at which the piezoelectric element 15 oscillates and consequently its current $I_L$, as can be seen in FIG. 1. The conversion cycle is synchronized with a mechanical movement of the piezoelectric element 15, and the driving frequency is then set to the mechanical oscillation frequency. In practice, this oscillation frequency depends on the operating point of converter 10: values of the three voltage levels and of the output current. Depending on the operating point, this oscillation frequency typically varies between the so-called series resonance frequency of the piezoelectric element 15 ($\omega_s=1/\sqrt{(LC)}$ where L and C correspond to the inductance and capacitance of a resonant branch 56 described below) and the so-called parallel resonance frequency of the piezoelectric element 15 ($\omega_p=1/\sqrt{(L*C*C_p/(C+C_p))}$), also respectively called resonant frequency and frequency of antiresonance of the piezoelectric element 15. The operating frequency of converter 10 is then between these two frequencies of resonance and antiresonance of piezoelectric element 15. The operating point varies slowly with regard to the frequency of oscillation of the piezoelectric element 15. The operating point typically evolves at less than 10 kHz, while the oscillation frequency of the piezoelectric element 15 is typically greater than or equal to 100 kHz. As a result, the operating frequency of converter 10 changes little from one period to the next.

In general, for the electrical energy converter 10 with the piezoelectric element 15 and controlled by the electronic control device 20, the number of phases at substantially constant voltage is greater than or equal to 4, this number of phases at substantially constant voltage being at least 3 with a prior state of the art drive device, and each substantially constant voltage phase is capable of being obtained from any combination of input and output voltages, in positive or negative value, or to be of null voltage. The energy converter 10 then makes it possible to exchange energy between the phases at substantially constant voltage, and consequently, with the voltages or combinations of voltages used to obtain these phases at substantially constant voltage. It is in particular possible to transfer energy from a phase with a substantially constant voltage of low voltage to a phase with a substantially constant voltage of higher voltage, and by the play of the above-mentioned combinations to obtain in the end a step-down converter, which may seem counter-intuitive. Conversely, it is also possible to transfer energy from a substantially constant voltage phase of high voltage to a substantially constant voltage phase of lower voltage, and by the play of the aforementioned combinations to obtain in the end a step-up converter—Those skilled in the art will then understand that it is possible to have a step-up cycle seen by the piezoelectric element 15 while the electrical energy converter 10 is a step-down converter, and conversely to obtain a step-down cycle seen by the piezoelectric element 15 while the electrical energy converter 10 is a step-up converter.

By convention, if a current is supplied to the piezoelectric element 15 during the substantially constant voltage phase corresponding to the highest voltage during a resonance cycle, then the cycle is considered to be a step-down cycle for the piezoelectric element 15. Conversely, if a current is delivered, or even drawn, from the piezoelectric element 15 during said phase at substantially constant voltage for which the voltage is highest during the resonance cycle, then the cycle is considered to be a step-up cycle for the piezoelectric element 15. As indicated above, the conversion cycle seen by the piezoelectric element 15 is likely to be a boost cycle while the electrical energy converter 10 operates as a step-down converter, and conversely the conversion cycle seen by the piezoelectric element 15 is likely to be a step-down cycle while the electrical energy converter 10 operates as a step-up converter.

The electronic control device 20 is configured to control the electrical energy converter 10, in particular to control the control of the switches $K_1$, $K_2$, $K_3$, $K_4$, $K_5$ of the converter, in order to alternate phases at substantially constant voltage at the terminals of the piezoelectric element 15 and of the phases at substantially constant charge, that is to say in substantially open circuit, across the terminals of said piezoelectric element 15.

The electronic control device 20 comprises a module 60 controlling a respective switching of each switch $K_1$, $K_2$, $K_3$, $K_4$, $K_5$.

In addition, the electronic control device 20 comprises a module 62 for regulating parameters $\delta_{buffer}$, $t_4$ associated with the resonance cycle of the piezoelectric element 15.

The control module 60 and the regulation module 62 are for example each made in the form of an electronic circuit comprising one or several electronic components, and in particular comparators when comparisons are made.

As a variant, the control module 60 and the regulation module 62 are each produced in the form of a programmable logic component, such as an FPGA (Field Programmable Gate Array), or in the form of an integrated circuit, such as an ASIC (Application Specific Integrated Circuit) or else in the form of a computer/calculator, such as a microcontroller, a processor. As a further variant, the control module 60 and the regulation module 62 are implemented together within a single hardware component, such as a single programmable logical component, a single integrated circuit, or a single calculator.

The control module 60 is configured to control, during a respective resonance cycle of the piezoelectric element 15, a switching of each of the switches $K_1$, $K_2$, $K_3$, $K_4$, $K_5$ to alternate phases II, IV, VI, VIII at substantially constant voltage at terminals 30, 34 of piezoelectric element 15 and phases I, III, V, VII at substantially constant charge at terminals 30, 34 of said piezoelectric element 15. Each resonance cycle comprises first and second half-cycles, the current $I_L$ flowing in a first direction in the piezoelectric element 15 during the first half-cycle and in a second direction, opposite to the first direction, during the second half-cycle.

According to the invention, the control module 60 is configured to control the switching of each of the switches $K_1$, $K_2$, $K_3$, $K_4$, $K_5$ so that the number $M_V$ of phases II, IV, VI, VIII at substantially constant voltage during of a respective resonance cycle is greater than or equal to the sum of E, N and two, and that each of the first and second half-cycles comprises at least two phases II, IV; VI, VIII at substantially constant voltage.

The number $M_V$ of phases at substantially constant voltage then verifies the following equation:

$$M_V \geq E+N+2 \quad (1)$$

where $M_V$ represents the number of substantially constant voltage phases during a respective resonance cycle; and E, and respectively N, represent the number of distinct input voltage(s), and respectively the number of distinct output voltage(s), E and N each being an integer greater than or equal to 1.

The total number M of phases at substantially constant voltage and of phases at substantially constant charge at the terminals of the piezoelectric element 15 during a resonance cycle, then typically verifies the following equation:

$$M \geq 2 \cdot (E+N+2) \quad (2)$$

where M represents the total number of substantially constant voltage phases and substantially constant load phases during a respective resonance cycle; and E, and respectively N, represent the number of distinct input voltage(s), and respectively the number of distinct output voltage(s), E and N each being an integer greater than or equal to 1.

In addition, this total number M phases at substantially constant voltage and phases at substantially constant load preferably satisfies the following equation:

$$M = M_V + M_C \quad (3)$$

where M represents the total number of phases of substantially constant voltage and the phases essentially constant during a respective resonance cycle; and $M_V$ represents the number of phases at substantially constant voltage during a respective resonance cycle; and $M_C$ represents the number of phases at substantially constant load during a respective resonance cycle.

As a further complement, the number of $M_V$ of phases at substantially constant voltage during a respective resonance cycle and the number of $M_C$ of phases at substantially constant load during a respective resonance cycle are preferably equal, and they then verify the following equation:

$$M_V = M_C \quad (4)$$

Those skilled in the art will observe that although the electrical energy converter 10 comprises five switches $K_1$, $K_2$, $K_3$, $K_4$, $K_5$ in the example of FIG. 1, it suffices for the converter 10 to comprise at least three switches for the implementation of the invention, in particular to have at least four phases at substantially constant voltage during a respective resonance cycle, that is to say so that the number $M_V$ verifies the previous equation (1) in the case where E and N equal to 1, and for each of the first and second half-cycles will include at least two phases at substantially constant voltage. By way of example, in the variant described below where a value $V_{buffer}$ of the voltage during the additional phase at substantially constant voltage during the first half-cycle is substantially equal to the value of the voltage during one phases at substantially constant voltage during the second half-cycle, such as the value $V_a$ or the value $V_c$, only three switches are necessary to obtain the various phases at substantially constant voltage at the respective values $V_a$, $V_b$ and $V_c$.

The regulation module 62 is configured to regulate a first parameter $\delta_{buffer}$ associated with the first half-cycle and a second parameter $t_4$ associated with the second half-cycle, each of the first $\delta_{buffer}$ and second $t_4$ parameters being a variable representing an end time instant of a respective phase at substantially constant voltage.

Preferably, the regulation module 62 is configured to regulate the first parameter $\delta_{buffer}$ according to a quantity $G_{out}$ representative of the output of the converter 10, and the second parameter $t_4$ according to a desired level of energy reserve or else depending on the first parameter $\delta_{buffer}$.

Figure 6:
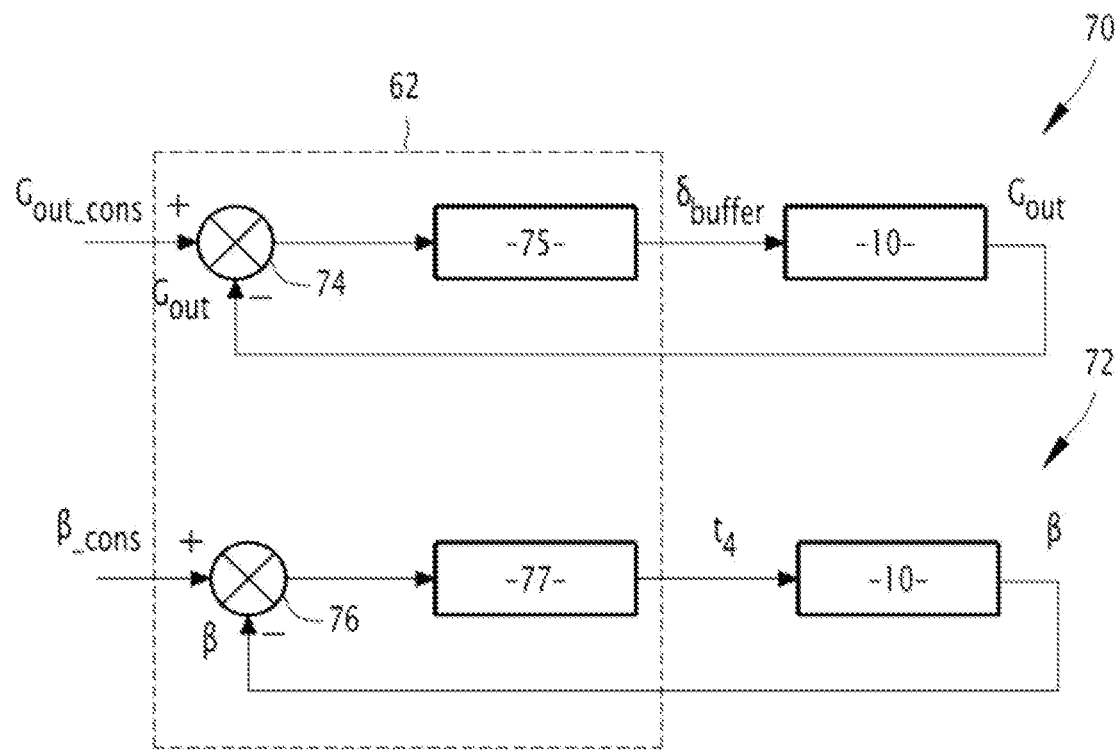
FIG. 6 is a schematic representation of a regulation of a first parameter associated with the first half-cycle and of a second parameter associated with the second half-cycle, each of the first and second parameters—being a variable representing a moment end time of a respective phase at substantially constant voltage.

In the example of FIG. 6, the regulation module 62 is configured to regulate the first parameter $\delta_{buffer}$ which is regulated via a first regulation loop 70, and the second parameter $t_4$ which is regulated via a second regulation loop 72, distinct of the first control loop 70. The first regulation loop 70 is typically faster than the second regulation loop 72, as will be described in more detail below with regard to FIG. 6.

Examples of the resonance cycle of the piezoelectric element 15 with alternation between phases at substantially constant charge and phases at substantially constant voltage will now be described with reference to FIGS. 2 to 5, FIG. 2 corresponding to an implementation with the prior art control device, and FIGS. 3 to 5 corresponding to implementations with the control device 20 according to the invention.

Within the prior art control device, the total number of substantially constant voltage phases and substantially constant charge phases across the terminals of the piezoelectric element 15 during a resonance cycle is greater than or equal to six. In the example of FIG. 2 obtained with the control device of the state of the art, this total number of phases is equal to six.

These successive phases of a resonance cycle will then be described in the six-phase example of FIG. 2, according to a generic format corresponding to the different configurations of the converter 10. Depicted in this generic format are three non-limiting examples of converters: lowering, boost, and deep lowering.

In the example of FIG. 2, these different phases correspond to an operation in steady state or steady state of the converter 10, that is to say from the moment when the resonance of the piezoelectric material is reached with a substantially constant amplitude, and then with substantially balanced energy and charge exchanges over each period T of the resonance cycle. To simplify the description, the losses in the switches $K_1$, $K_2$, $K_3$, $K_4$, $K_5$ in the on state, as well as the losses in the piezoelectric material at resonance are neglected.

FIG. 2 then represents the evolution of the current $I_L$ flowing in the piezoelectric element 15; the voltage $V_p$ across the terminals of the piezoelectric element 15, also represented in FIG. 1; and of the mechanical deformation of the piezoelectric element 15, represented by the curve 26; this during a resonance cycle and for three distinct conversion configurations of the converter 10, namely a first configuration C1 as a step-down voltage seen from the piezoelectric element 15, a second configuration C2 as a voltage booster seen from the piezoelectric element 15, and a third configuration C3 in strong step-down mode seen from the piezoelectric element 15.

By convention, a first time instant of switching at time instant t0, or even at time instant $t_6$ described below, corresponds to a crossing through zero and through decreasing values of the current $I_L$ flowing in the piezoelectric element 15.

From this passage through zero of the current $I_L$ flowing in the piezoelectric element 15, corresponding to this first switching time instant, then begins a first phase I corresponding to a phase at substantially constant charge, this first phase I flowing between time instant to and time instant $t_1$ in the example of FIG. 2. The end of this first phase I corresponds to the moment when the voltage $V_p$ across the terminals of the piezoelectric element 15 reaches a predefined value $V_b$.

At the time instant $t_1$, begins a second phase II corresponding to a phase at substantially constant voltage at the value $V_b$, the start of this second phase II then being obtained by the closing of at least one respective switch among the switches $K_1$, $K_2$, $K_3$, $K_4$, $K_5$, the switch or switches closed at this moment depending on the value $V_b$, the value $V_b$ being for example equal to the input voltage $V_{in}$ or else to the output voltage $V_{out}$. Time instant $t_1$ then forms a second switching time instant.

A third switching time instant, denoted $t_2$, corresponds to the opening of at least one of the switches previously closed at time instant $t_1$, and the voltage $V_p$ across the terminals of the piezoelectric element 15 then changes from a previous voltage $V_b$ at an open circuit position. At this third switching instant $t_2$ begins a third phase III lasting until a time instant $t_3$ corresponding to a zero crossing of the current $I_L$ flowing in the piezoelectric element 15. Previously, the time instant $t_2$ has been defined so that at the time instant $t_3$, the voltage $V_p$ across the terminals of the piezoelectric element 15 reaches a value $V_a$ or else a value $V_{ZVS}$ corresponding to the value allowing switching to zero voltage of the corresponding switch.

At time instant $t_3$, a fourth phase IV begins. At this time instant $t_3$, if the value $V_{ZVS}$ is equal to the value $V_a$, then the piezoelectric element 15 can pass from the phase at substantially constant charge (or in substantially open circuit) to a following phase at substantially constant voltage at the value $V_a$, and the time instant $t_3$ then forms a fourth switching time instant corresponding to the closing of at least one other respective switch among the switches $K_1$, $K_2$, $K_3$, $K_4$, $K_5$; the value $V_a$ being for example equal to the input voltage $V_{in}$, to the zero voltage of the electrical mass 48 or even to the voltage difference $V_{in}-V_{out}$ equal to input voltage $V_{in}$ minus output voltage $V_{out}$. In the example of FIG. 2, the fourth switching time instant is the moment $t_3$ in the case of the first and second configurations C1, C2.

If at the time instant $t_3$, the value $V_{ZVS}$ is different from the value $V_a$, then the piezoelectric element 15 is maintained in open circuit until the aforementioned switch(es) for obtaining the value $V_a$ pass through a zero voltage at their terminals, and the fourth switching time instant corresponding to the closing of the switch(es) and the start of the phase at substantially constant voltage at the value $V_a$ is then denoted $t_{3b}$, as represented in FIG. 2 in the case of the third configuration C3.

This fourth phase IV is then a voltage phase substantially constant at the value $V_a$, and lasts until an time instant $t_4$ which forms an adjustment parameter of the converter 10, this time instant $t_4$ making it possible to define the voltage, the current or even the desired power at the output of the converter 10.

The time instant $t_4$ then corresponds to the end of the fourth phase IV and to the time at which the switch or switches associated with obtaining the value $V_a$ must then be opened, the time instant $t_4$ forming a fifth time instant of switching—corresponding to the opening of the previously closed switch(es) at time instant $t_3$, $t_{3b}$.

At the fifth switching time instant, a fifth phase V begins, corresponding to a phase with a substantially constant load, or even in a substantially open circuit, this fifth phase V lasting until a time instant $t_5$ defined by the passage to a new predefined value $V_c$ of the voltage $V_p$ across the terminals of the piezoelectric element 15. The time instant $t_5$ forming the end of the fifth phase V corresponds to the closing of at least one other respective switch among the switches $K_1$, $K_2$, $K_3$, $K_4$, $K_5$, the switch or switches closed at this moment depending on the value $V_c$, the value $V_c$ being for example equal to the zero voltage of the electrical mass 48, to the output voltage $V_{out}$, or else to the opposite $-V_{out}$ of the output voltage $V_{out}$. Time instant $t_5$ then forms a sixth switching time instant.

At the time instant $t_5$ then begins the sixth phase VI corresponding to a phase at substantially constant voltage at the value $V_c$, this sixth phase VI lasting until the time instant to, or even until a time instant $t_6$ modules the period T of the resonance cycle defined by the zero crossing of the current $I_L$ flowing in the piezoelectric element 15, and according to a monotonicity opposite to that of the zero crossing at time instant $t_3$. By convention, time instant $t_6$ is equal to the sum of time instant $t_0$ and period T of the resonance cycle, and is also defined ($t_0$+T).

In the example of FIG. 2, the time instant $t_6$ corresponds to the end of a resonance cycle of the piezoelectric element 15, the cycle represented having been defined with respect to the time instants of passage to zero of the current $I_L$ flowing in the piezoelectric element 15.

Those skilled in the art will then observe that in this example of the six-phase resonance cycle obtained with the prior art control device, and presented generically for different configurations C1 to C3 with regard to FIG. 2, the three phases at substantially constant voltage correspond to the predefined values $V_a$, $V_b$ and $V_c$ of the voltage $V_p$ at the terminals of the piezoelectric element 15; and the three phases at substantially constant load, or else in open circuit, at the terminals of the element piezoelectric element 15 then correspond to phases where the voltage $V_p$ at the terminals of the piezoelectric element 15 varies from one value to another among the three predefined values $V_a$, $V_b$ and $V_c$, precisely from the value $V_a$ to the value $V_c$, then to the value $V_b$, and so on in the example of FIG. 2.

By convention, when the purpose of the converter 10 is to supply a positive current under a maximum voltage $V_{max}$, the three predefined values $V_a$, $V_b$ and $V_c$ are classed by increasing values with $V_a<V_b<V_c$, and the current $I_L$ flowing in the piezoelectric element 15 is defined as positive when it contributes to supplying a positive current under the voltage $V_{max}$. In a complementary manner, when the purpose of the converter 10 is to draw a positive current under the maximum voltage $V_{max}$, the predefined values $V_a$, $V_b$ and $V_c$ are ranked in decreasing order with then $V_a>V_b>V_c$, and the current $I_L$ flowing in the piezoelectric element 15 is defined as positive when it contributes to drawing a positive current under the maximum voltage $V_{max}$.

Figure 3:
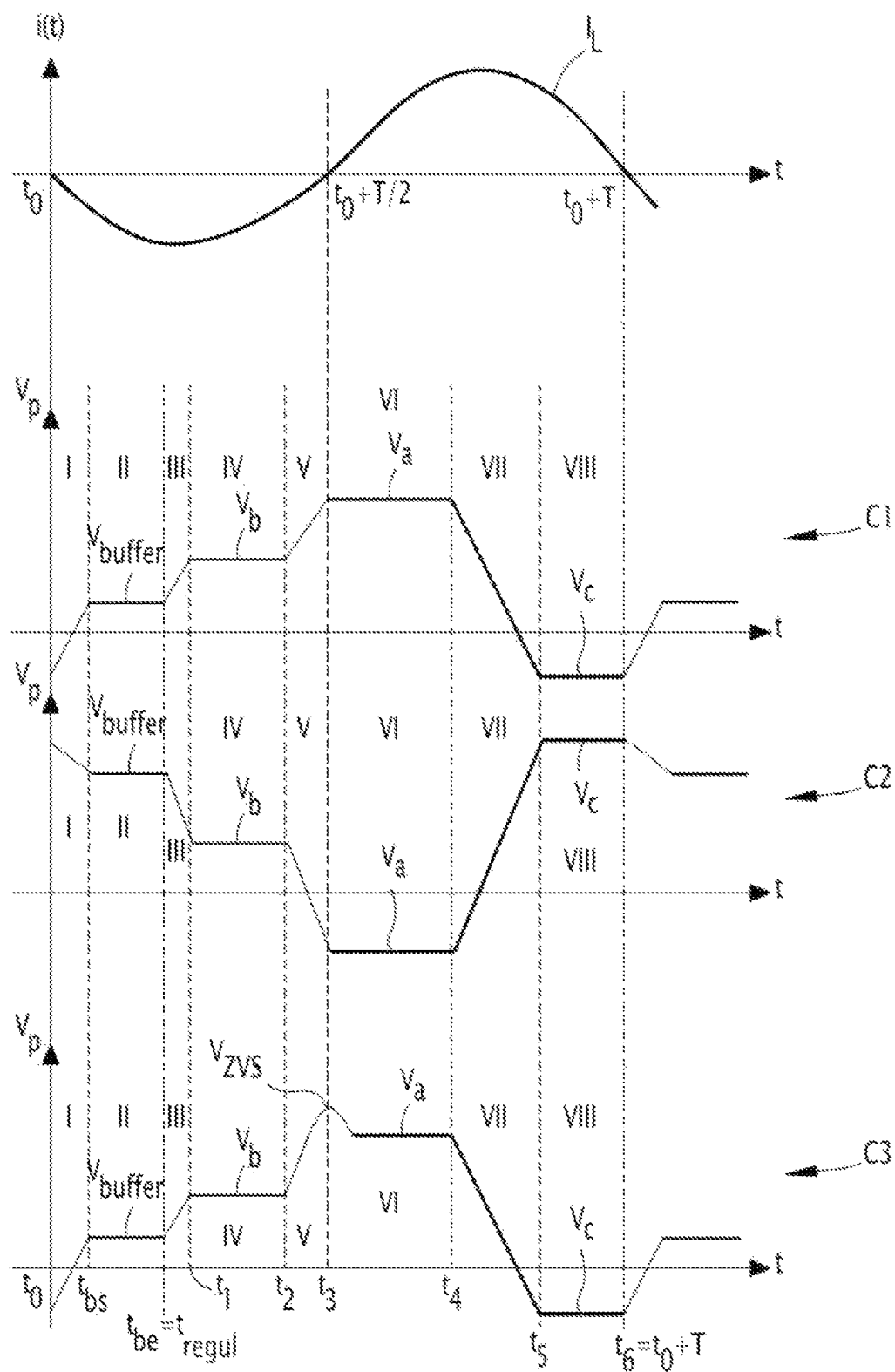
FIG. 3 is a view similar to that of FIG. 2, with the converters according to the invention and according to a first example of embodiment.
Figure 4:
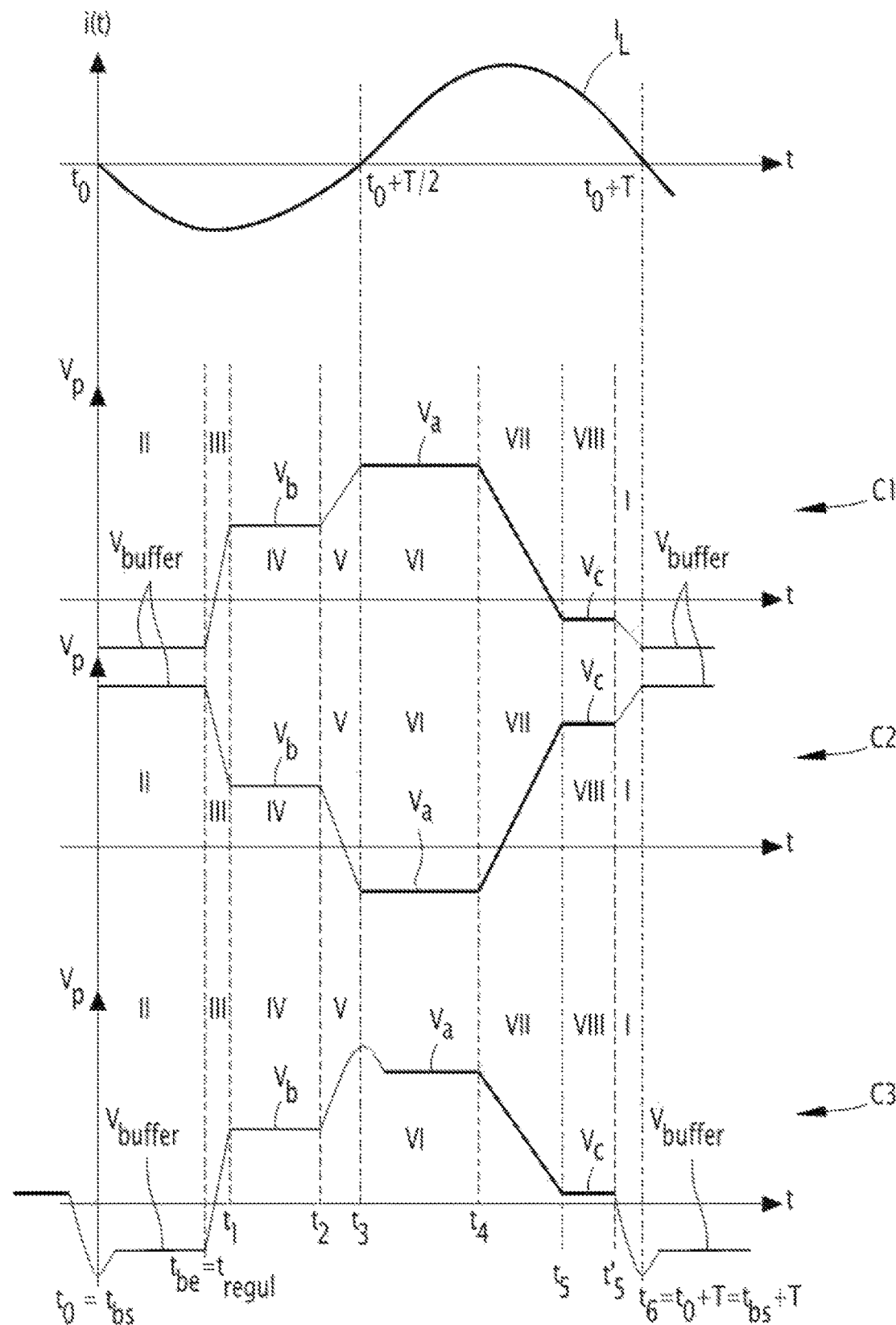
FIG. 4 is a view similar to that of FIG. 3 according to a second embodiment.
Figure 5:
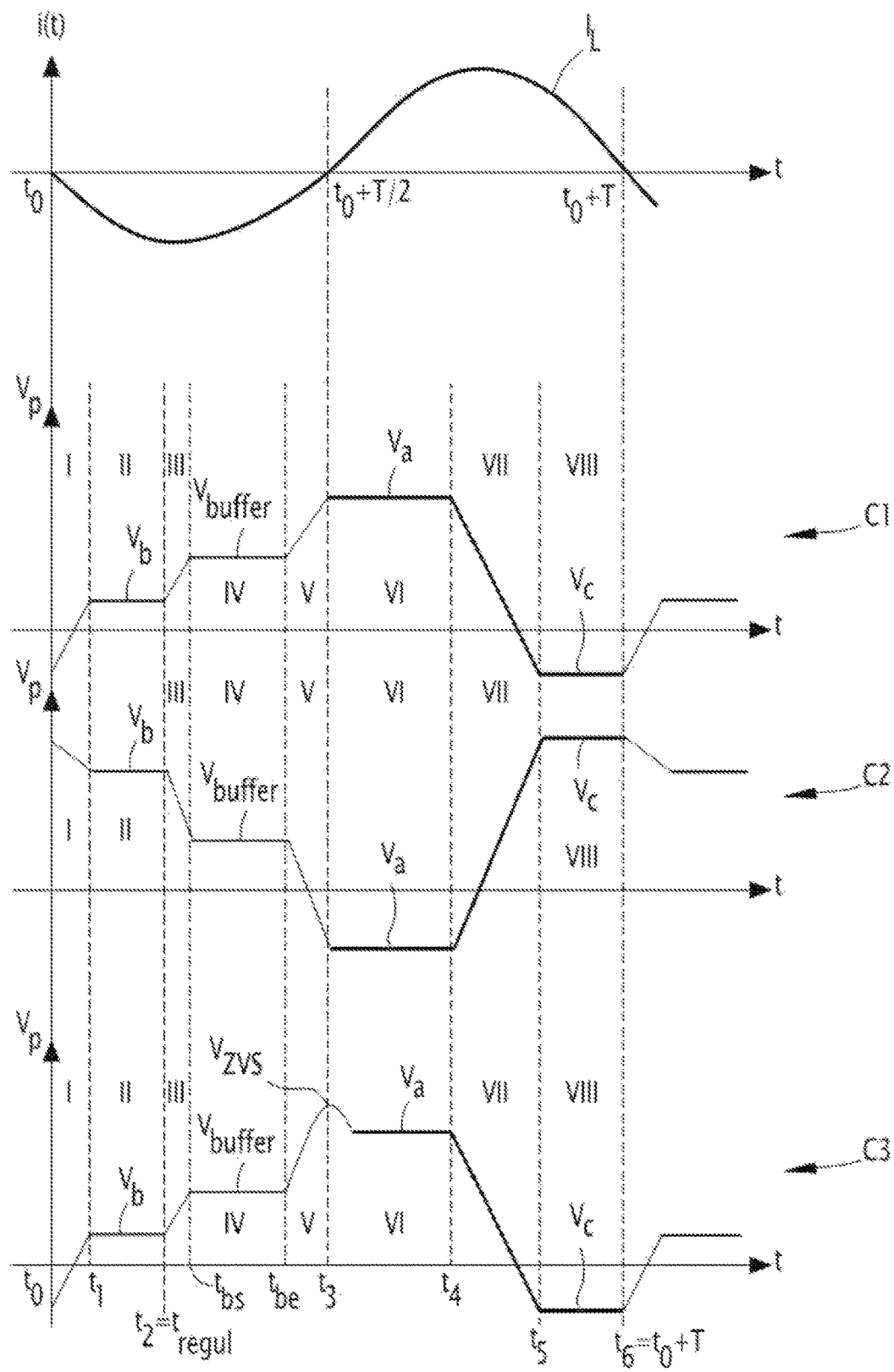
FIG. 5 is a view similar to that of FIG. 3 following a third embodiment.

In the examples of FIGS. 3 to 5 obtained with the control device 20 according to the invention, the total number of phases M is equal to eight, and the number $M_V$ of phases at substantially constant voltage and $M_C$ of phases at substantially constant load are each equal to four, the numbers E and N each being equal to 1 in these examples with a single input voltage $V_{in}$ and a single output voltage $V_{out}$.

The control device 20 according to the invention, and in particular the control module 60, is then configured to control each respective resonance cycle with an additional phase at substantially constant voltage, the voltage being at the value $V_{buffer}$ during this additional phase, the start of this additional phase corresponding to the time instant $t_{bs}$, and the end of this additional phase corresponding to a time instant $t_{be}$.

In the examples of FIGS. 3 to 5, this additional phase at voltage substantially constant at the value $V_{buffer}$ is added during the first half-cycle where, by convention in these examples, the current $I_L$ flowing in the piezoelectric element 15 is negative.

In the examples of FIGS. 3 and 4, the additional phase with a substantially constant voltage at the value $V_{buffer}$ is inserted between the phases with a substantially constant voltage of value equal to $V_c$ and respectively to $V_b$. In these examples, the additional phase at substantially constant voltage at value $V_{buffer}$ is denoted II, the phase at substantially constant voltage at value $V_b$ being denoted IV, that at value $V_a$ being denoted VI, and finally that at value $V_c$ being denoted VIII, the phases with a substantially constant charge being respectively denoted I, III, V and VII. In the example of FIG. 3, the value $V_{buffer}$ of the substantially constant voltage during the additional phase is between the values $V_b$ and $V_c$. In the example of FIG. 4, the value $V_{buffer}$ is not between the values $V_b$ and $V_c$, this value $V_{buffer}$ being for example less than each of the values $V_a$, $V_b$ and $V_c$, and then forming the lowest substantially constant voltage value during the resonance cycle, this for the first and third configurations C1, C3 in the example of FIG. 4; or even greater than each of the values $V_a$, $V_b$ and $V_c$, and then forming the highest voltage value substantially constant during the resonance cycle, as for the second configuration C2 in the example of FIG. 4.

In the example of FIG. 5, the additional phase with substantially constant voltage at value $V_{buffer}$ is inserted between the phase with substantially constant voltage at value $V_b$ and that at value $V_a$. In this example, the value $V_{buffer}$ of the substantially constant voltage during the additional phase is then between the values $V_b$ and $V_a$. In the example of FIG. 5, the additional phase with a substantially constant voltage at the value $V_{buffer}$ is then denoted IV, and those at the voltage $V_b$, $V_a$ and respectively $V_c$ are denoted II, VI and respectively VIII, the phases with a substantially constant load constant being always noted I, III, V and VII, as in the examples of FIGS. 3 and 4.

In each of the examples of FIGS. 3 to 5, the time instant $t_{bs}$ forming the start of the additional phase at substantially constant voltage at the value $V_{buffer}$ corresponds to the closing of at least one respective switch among the switches $K_1$, $K_2$, $K_3$, $K_4$, $K_5$, the switch(es) closed at this moment depending on the value $V_{buffer}$. The value $V_{buffer}$ is for example equal to zero voltage or to the voltage difference $V_{out}-V_{in}$ equal to the output voltage $V_{out}$ minus the input voltage $V_{in}$ in the example of FIG. 3, opposite $-V_{out}$ of the output voltage $V_{out}$, or even the sum $V_{in}+V_{out}$ of the input voltages $V_{in}$ and output voltages $V_{out}$ in the example FIG. 4; or again to the voltage difference $V_{in}-V_{out}$ equal to the input voltage $V_{in}$ minus the output voltage $V_{out}$ in the first and third configurations $C_1$, $C_3$ of FIG. 5, and to the voltage difference $V_{out}-V_{in}$ equal to the output voltage $V_{out}$ minus the input voltage $V_{in}$ in the second configuration $C_2$ in FIG. 5.

In these examples of FIGS. 3 to 5, the time instant $t_{be}$ forming the end of the additional phase at substantially constant voltage at the value $V_{buffer}$ then corresponds to the opening of at least one of the previously closed switches, the phase following the phase additional substantially constant voltage being a substantially constant load phase, that is to say in substantially open circuit, across the terminals of the piezoelectric element 15, and then requiring the opening of at least part of the switches $K_1$ to $K_5$.

In the example of FIG. 3, and analogously to the example of FIG. 2, the value $V_a$ is typically equal to the input voltage $V_{in}$ for the first configuration $C_1$, to the voltage $-V_{in}$ opposite to the input voltage $V_{in}$ for the second configuration $C_2$ and the voltage difference $V_{in}-V_{out}$ equal to the input voltage $V_{in}$ minus the output voltage $V_{out}$ for the third configuration $C_3$.

In this example of FIG. 3, the value $V_b$ is then for example equal to the output voltage $V_{out}$ for the first and third configurations $C_1$, $C_3$, and to the input voltage $V_{in}$ for the second configuration $C_2$. In this example of FIG. 3, the value $V_c$ is typically equal to the opposite $-V_{out}$ of the output voltage $V_{out}$ for the first and third configurations $C_1$, $C_3$, and to the output voltage $V_{out}$ for the second configuration $C_2$.

In the example of FIG. 4, the value $V_a$ is typically equal to the input voltage $V_{in}$ for the first configuration $C_1$, the opposite $-V_{out}$ of the output voltage $V_{out}$ for the second configuration C2 and at the voltage difference $V_{in}-V_{out}$ equal to the input voltage $V_{in}$ minus the output voltage $V_{out}$ for the third configuration $C_3$. The value $V_b$ is typically equal to the output voltage $V_{out}$ for the first and third configurations $C_1$, $C_3$, at the input voltage $V_{in}$ for the second configuration $C_2$. In this example of FIG. 4, the value $V_c$ is typically equal to zero voltage for the first and third configuration $C_1$, $C_3$, and the voltage difference $V_{out}-V_{in}$ equal to the output voltage $V_{out}$ minus the input voltage $V_{in}$ for the second configuration $C_2$.

In the example of FIG. 5, the value $V_a$ is for example equal to the input voltage $V_{in}$ for the first and third configurations $C_1$, $C_3$, and the opposite $-V_{in}$ of the input voltage $V_{in}$ for the second $C_2$ setup. The value $V_b$ is for example equal to the output voltage $V_{out}$ for the first and third configurations $C_1$, $C_3$, and to the input voltage $V_{in}$ for the second configuration $C_2$. In this example of FIG. 5, the value $V_c$ is typically equal to the zero voltage for the first configuration $C_1$, at the output voltage $V_{out}$ for the second configuration $C_2$ and the opposite $-V_{out}$ of the output voltage $V_{out}$ for the third configuration $C_3$.

In the examples of FIGS. 3 to 5, the values $V_a$, $V_b$, $V_c$, $V_{buffer}$ of the voltages during the substantially constant voltage phases are all distinct from each other during a respective resonance cycle.

In the examples of FIGS. 3 to 5, the values $V_a$, $V_b$, $V_c$, $V_{buffer}$ voltages during phases at substantially constant voltage are then obtained for example via the switching of switches $K_1$ to $K_5$ of the converter 10 of the FIG. 1 for the first and third configurations C1, C3, or by switching the switches $K_1$ to $K_8$ of the converter of FIG. 19 of document FR 3 086 472 A1 for the second configuration C2, according to the closing and opening of the switches indicated in table 1 below.

In the example of FIGS. 3 and 4 for the third configuration C3, for the end of the phase at substantially constant voltage at the value $V_b$, the switch $K_4$ can be opened a little later, for example when passing through the value $V_{ZVS}$ at time $t_3$; and for the start of the phase at substantially constant voltage at the value $V_a$, the switch $K_1$ can be closed a little before, for example when passing through the value $V_{ZVS}$ at time $t_3$.

TABLE 1

| Figure | Configuration | Phase to voltage substantially constant with indication of the switches closed during said phase | Beginning | End |
|---|---|---|---|---|
| FIG. 3 | C1 | $V_{buffer} = 0$ ($K_4$, $K_5$ closed) | Closing of $K_4$ | Opening $K_5$ |
| | | $V_b = V_{out}$ ($K_2$, $K_4$ closed) | Closing of $K_2$ | Opening $K_2$ |
| | | $V_a = V_{in}$ ($K_1$, $K_4$ closed) | Closing of $K_1$ | Opening $K_1$, $K_4$ |
| | | $V_c = -V_{out}$ ($K_3$, $K_5$ closed) | Closing of $K_3$, $K_5$ | Opening $K_3$, $K_5$ |
| | C2 | $V_{buffer} = V_{out} - V_{in}$ ($K_2$, $K_4$, $K_5$, $K_7$ closed) | Closing of $K_7$ | Opening $K_2$, $K_5$, $K_7$ |
| | | $V_b = V_{in}$ ($K_1$, $K_6$, $K_4$, $K_8$ closed) | Closing of $K_1$, $K_6$, $K_8$ | Opening $K_1$, $K_6$ |
| | | $V_a = -V_{in}$ ($K_5$, $K_7$, $K_4$, $K_8$ closed) | Closing of $K_5$, $K_7$ | Opening $K_7$, $K_8$ |
| | | $V_c = V_{out}$ ($K_5$, $K_6$, $K_2$, $K_4$ closed) | Closing of $K_6$, $K_2$ | Opening $K_6$ |
| | C3 | $V_{buffer} = 0$ ($K_4$, $K_5$ closed) | Closing of $K_4$ | Opening K5 |
| | | $V_b = V_{out}$ ($K_2$, $K_4$ closed) | Closing of $K_2$ | Opening $K_2$, ($K_4$) |
| | | $V_a = V_{in} - V_{out}$ ($K_1$, $K_3$ closed) | Closing of ($K_1$), $K_3$ | Opening $K_1$ |
| | | $V_c = -V_{out}$ ($K_3$, $K_5$ closed) | Closing of $K_5$ | Opening $K_3$ |
| FIG. 4 | C1 | $V_{buffer} = -V_{out}$ ($K_3$, $K_5$ closed) | Closing of $K_3$ | Opening $K_3$, $K_5$ |
| | | $V_b = V_{out}$ ($K_2$, $K_4$ closed) | Closing of $K_2$, $K_4$ | Opening $K_2$ |
| | | $V_a = V_{in}$ ($K_1$, $K_4$ closed) | Closing of $K_1$ | Opening $K_1$ |
| | | $V_c = 0$ ($K_4$, $K_5$ closed) | Closing of $K_5$ | Opening $K_4$ |
| | C2 | $V_{buffer} = V_{out} + V_{in}$ ($K_2$, $K_4$, $K_1$, $K_6$ closed) | Closing of $K_1$, $K_6$ | Opening $K_2$ |
| | | $V_b = V_{in}$ ($K_4$, $K_8$, $K_1$, $K_6$ closed) | Closing of $K_8$ | Opening $K_4$, $K_1$ |
| | | $V_a = -V_{out}$ ($K_3$, $K_8$, $K_5$, $K_6$ closed) | Closing of $K_3$, $K_5$ | Opening $K_3$, $K_8$, $K_7$ |
| | | $V_c = V_{out} - V_{in}$ ($K_2$, $K_4$, $K_5$, $K_7$ closed) | Closing of $K_2$, $K_4$, $K_7$ | Opening $K_5$, $K_7$ |
| | C3 | $V_{buffer} = -V_{out}$ ($K_3$, $K_5$ closed) | Closing of $K_5$ | Opening $K_3$, $K_5$ |
| | | Vb = Vout ($K_2$, $K_4$ closed) | Closing of $K_2$, $K_4$ | Opening $K_2$, ($K_4$) |
| | | $V_a = V_{in} - V_{out}$ ($K_1$, $K_3$ closed) | Closing of ($K_1$), $K_3$ | Opening $K_1$ |
| | | $V_c = 0$ ($K_2$, $K_3$ closed) | Closing of $K_2$ | Opening $K_2$ |
| FIG. 5 | C1 | Vb = Vout ($K_2$, $K_4$ closed) | Closing of $K_2$ | Opening $K_2$, $K_4$ |
| | | $V_{buffer} = V_{in} - V_{out}$ ($K_1$, $K_3$ closed) | Closing of $K_1$, $K_3$ | Opening $K_3$ |
| | | $V_a = V_{in}$ ($K_1$, $K_4$ closed) | Closing of $K_4$ | Opening $K_2$ |
| | | Vc = 0 ($K_4$, $K_5$ closed) | Closing of $K_5$ | Opening $K_5$ |
| | C2 | $V_b = V_{in}$ ($K_4$, $K_8$, $K_1$, $K_6$ closed) | Closing of $K_8$, $K_1$ | Opening $K_8$, $K_1$, $K_6$ |
| | | $V_{buffer} = V_{out} - V_{in}$ ($K2$, $K4$, $K5$, $K7$ closed) | Closing of $K_2$, $K_5$, $K_7$ | Opening $K_2$ |
| | | $V_a = -V_{in}$ ($K_4$, $K_8$, $K_5$, $K_7$ closed) | Closing of $K_8$ | Opening $K_8$, $K_7$ |
| | | $V_c = V_{out}$ ($K_2$, $K_4$, $K_5$, $K_6$ closed) | Closing of $K_2$, $K_6$ | Opening $K_2$, $K_5$ |
| | C3 | Vb = Vout ($K_2$, $K_4$ closed) | Closing of $K_2$, $K_4$ | Opening $K_2$, $K_4$ |
| | | $V_{buffer} = V_{in} - V_{out}$ ($K_1$, $K_3$ closed) | Closing of $K_1$, $K_3$ | Opening $K_3$ |
| | | Va = Vin ($K_1$, $K_4$ closed) | Closing of $K_4$ | Opening $K_1$, $K_4$ |
| | | Vc = -Vout ($K_3$, $K_5$ closed) | Closing of $K_3$, $K_5$ | Opening $K_3$, $K_5$ |

In a variant not shown, the value $V_{buffer}$ of the voltage during the additional phase at substantially constant voltage during the first half-cycle is substantially equal to the value of the voltage during one of the phases at substantially constant voltage during the second half-cycle, such as the value $V_a$ or the value $V_c$. According to this variant, the value $V_{buffer}$ is then typically substantially equal to the value $V_a$ or to the value $V_c$.

According to this variant, the substantially constant voltage phases having substantially the same voltage value during the first half-cycle and during the second half-cycle are preferably one after the other, and then form the same phase at substantially constant voltage extending over two successive half-cycles.

According to this variant, those skilled in the art will also observe that when the value $V_{buffer}$ is equal to the value $V_a$ or to the value $V_c$, this forms an extended phase at substantially constant voltage, since it extends over two half-cycles successive with an inversion of the sign of the internal current $I_L$ during the transition from one half-cycle to another, then said phase at substantially constant voltage extending over two successive half-cycles is counted, taking into account said inversion of the sign internal current $I_L$, as two phases within the meaning of the present invention, and in particular of equation (1) above.

According to this variant, those skilled in the art will also observe that the change of sign of the internal current $I_L$ during the extended phase at substantially constant voltage corresponds to the transition from one half-cycle to another, that is to i.e. at the time instant $t_0$ or again at the time instant $t_3$. In addition, this change of sign of the internal current $I_L$ during said extended phase at substantially constant voltage does not require switching of one of the switches $K_1$ to $K_5$ of the converter 10.

According to this variant, when the value $V_{buffer}$ is equal to the value $V_c$, and the additional phase at substantially constant voltage immediately follows the phase at substantially constant voltage at the value $V_c$, then the time instant $t_{bs}$ of the start of this additional phase is typically confused with the time instant $t_6$. This time instant $t_6$ corresponds to the end of the phase at substantially constant voltage at the value $V_c$ according to the examples of FIGS. 3 and 5. Similarly, those skilled in the art will also understand that when the value $V_{buffer}$ is equal to the value $V_a$, and the additional phase at substantially constant voltage immediately precedes the phase at substantially constant voltage at the value $V_a$, then the time instant $t_{be}$ of the end of this additional phase coincides with the time instant $t_3$ of the start of the phase at substantially constant voltage at the value $V_a$.

Different examples of the values $V_a$, $V_b$, $V_c$, $V_{buffer}$ of the voltage of each of the phases at substantially constant voltage have been described previously with regard to FIGS. 3 to 5.

More generally, the value $V_a$, $V_b$, $V_c$, $V_{buffer}$ of the voltage of each of the substantially constant voltage phases is selected from the group consisting of: zero value; $V_{in}$; $V_{ek}$ value of a respective input voltage; opposite $-V_{in}$; $-V_{ek}$ of the value of a respective input voltage; value Vout; Vsl of a respective output voltage; opposite $-V_{out}$; $-V_{sl}$ the value of a respective output voltage; and linear combination $V_{in}-V_{out}$; Vout-Vin; $V_{in}+V_{out}$; $-V_{in}-V_{out}$; $V_{ek}-V_{sl}$; $V_{sl}-V_{ek}$; $V_{ek}+V_{sl}$; $-V_{ek}-V_{sl}$ of the above values; the input voltage(s) being denoted $V_{ek}$ where k is an integer index associated with the input voltage and comprised between 1 and E, and the distinct output voltage(s) being denoted $V_{sl}$, where l is an integer index associated with the output voltage and between 1 and N. As indicated above, in the case of a converter 10 with a single input voltage and a single output voltage, the input voltage and the output voltage are denoted $V_{in}$ and $V_{out}$ respectively for the sake of simplifying notations.

In steady state, at constant input/output voltages and at constant output current, there is a balance between the power supplied to the piezoelectric element 15 and the power restored by the piezoelectric element 15, except for the aforementioned losses. The amplitude of the current $I_L$ flowing in the piezoelectric element 15 is then constant, and the Value $\hat{I}_L$ of this amplitude of the current $I_L$ is directly linked to the output current as by the following equation:

$$\hat{I}_L = I_{L0} + \alpha \cdot I_{out} \tag{5}$$

with $I_{out}$ representing the output current;
$I_{L0}$ and $\alpha$ which depend on the topology used and the values of the input/output voltages.

The value $\hat{I}_L$ of the amplitude of the current $I_L$ in steady state is also called useful amplitude.

To increase the output power $P_{out}$ of the converter 10, and for example the output current $I_{out}$, it is necessary to take the converter 10 to a new state of equilibrium leading to a higher value of the useful amplitude $\hat{I}_L$ of the internal current, in order to be able to provide the higher output current required, according to equation (5) above.

Figure 7:
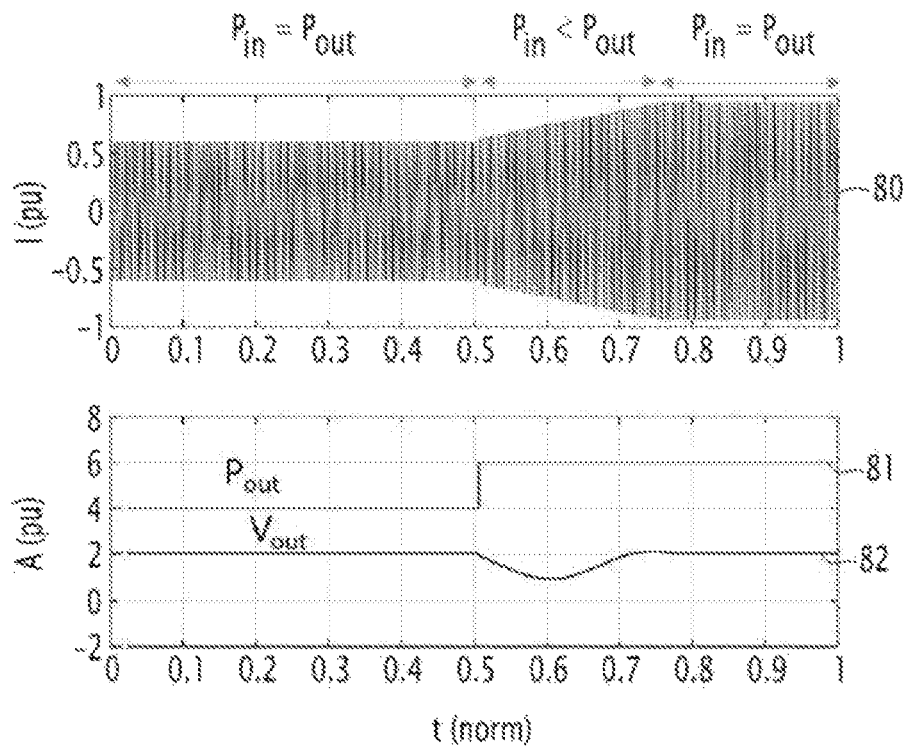
FIG. 7 is a view of curves of the current internal to the piezoelectric element, as well as of the output power and the output voltage delivered by the converter with, on the one hand, a first set of such curves obtained with the control device of the state of the art, and on the other hand, a second set of such curves obtained with the control device according to the invention; according to a first example corresponding to an increase in output power.
Figure 7:
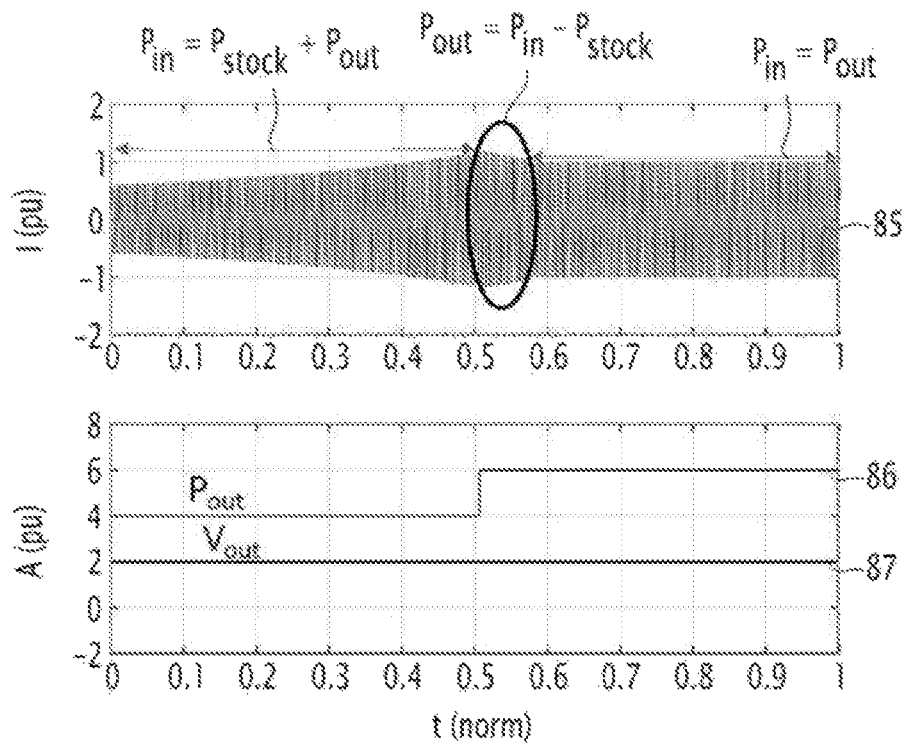

With the prior art control device, to cause this increase in the internal current $I_L$, it is necessary to increase the power supplied to the piezoelectric element 15 with respect to what the piezoelectric element 15 redelivers. This power imbalance indeed leads to an increase in the amplitude of the internal current $I_L$ of the piezoelectric element 15, as shown in FIG. 7 via the curve 80 representing the internal current $I_L$ with the device for controlling the state of the technically, the curves 81 and 82 representing respectively the output power $P_{out}$ and the output voltage $V_{out}$ of the converter 10 in this case. However, during this transient, i.e. as long as the useful amplitude $\hat{I}_L$ of the internal current has not reached its new value, it is not possible to supply the new current requested at the output, which leads to, for example, a drop in the output voltage $V_{out}$ in the case of regulation of the output voltage, as shown in FIG. 7 in curve 82. Moreover, this transient state can last several tens of resonance cycles, that is to say a few ms for an operation at 100 kHz.

With the control device 20 according to the invention, the second degree of freedom provided by the additional phase at substantially constant voltage at the value $V_{buffer}$ makes it possible to pre-position the useful amplitude $\hat{I}_L$ of the internal current at a higher value than what was imposed under equation (5) above. It is indeed possible, thanks to the invention, to integrate into the useful amplitude $\hat{I}_L$ of the internal current, a reserve current $I_{reserve}$, as described under the following equation:

$$\hat{I}_L = I_{L0} + \alpha \cdot I_{out} + I_{reserve} \tag{6}$$

Thus, if the current demanded at the output increases suddenly, the current $I_L$ will be of sufficient amplitude to immediately satisfy the increase in the output current, from the moment when the reserve current $I_{reserve}$ was greater than $\alpha * \Delta I_{out}$. If the reserve current $I_{reserve}$ was not sufficient, it will nevertheless have made it possible to reduce the duration of the transient and therefore to limit the drop in the output voltage $V_{out}$.

The control device 20 according to the invention then makes it possible, ideally, to maintain the output voltage $V_{out}$ at its set value throughout the transient state, as shown in FIG. 7 with the curves 85, 86 and 87 representing respectively the internal current $I_L$, the output power $P_{out}$ and the output voltage $V_{out}$ of the converter 10 in the event of an increase in the output power $P_{out}$, with the control device 20 according to the invention. The control device 20 according to the invention makes it possible at least to limit the drop in the output voltage $V_{out}$ if the current demanded at the output increases suddenly. The buffer energy reserve is then gradually replenished following this power variation, without impacting the output.

To reduce the output power $P_{out}$ of the converter 10, the amplitude $\hat{I}_L$ of the internal current must decrease until it reaches a new value according to a new permanent state.

Figure 8:
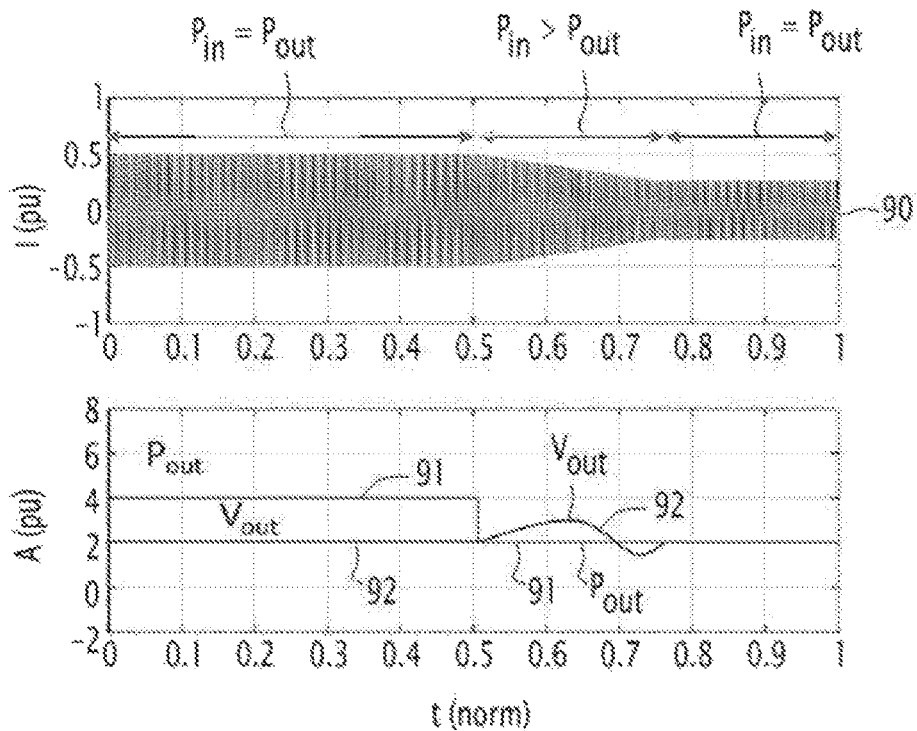
FIG. 8 is a view similar to that of FIG. 7, according to a second example corresponding to a reduction in the output power of the electrical energy converter.
Figure 8:
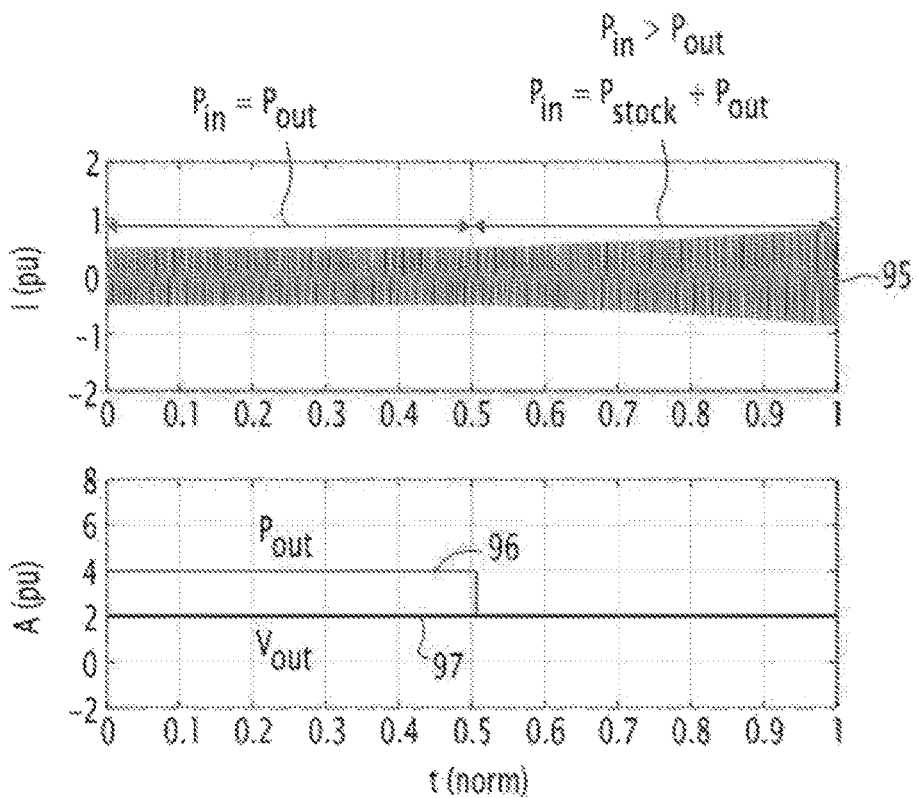

With the control device of the state of the art, during the transient state corresponding to this reduction in the output power $P_{out}$, power supplied to the piezoelectric element 15 is reduced compared to what the piezoelectric element 15 returns, the stored mechanical energy decreases. During this transition, the amplitude of the current $I_L$ decreases. However, during this transient, the current $I_L$ is too high compared to the requirement and continues to produce an output power value $P_{out}$ which is greater than that requested, which can lead to an overvoltage at the output, as shown in FIG. 8 with the curves 90, 91 and 92 respectively representing the internal current $I_L$, the output power $P_{out}$ and the output voltage $V_{out}$ of converter 10 in the event of a decrease in output power $P_{out}$, with the control device of the state of the art, the curve 92 shows this overvoltage after a reduction of the output power $P_{out}$. Moreover, this transient state can last several tens of resonance cycles, that is to say a few ms for operation at 100 kHz.

With the control device 20 according to the invention, the second degree of freedom provided by the additional phase at substantially constant voltage at the value $V_{buffer}$ makes it possible to reduce the output current $I_{out}$ to the benefit of the reserve current $I_{reserve}$, according to the previous equation (6). The output current $I_{out}$ can therefore be modified almost instantaneously, that is to say after one or a few resonance cycles, to satisfy the setpoint in output voltage $V_{out}$, or in output current $I_{out}$ or even in output power $P_{out}$.

With the control device 20 according to the invention, the output voltage $V_{out}$ is then kept stable during this transient decrease in output power $P_{out}$, as shown in FIG. 8 with the curves 95, 96 and 97 respectively representing the internal current $I_L$, the output power $P_{out}$ and the output voltage $V_{out}$ of the converter 10 in the event of a decrease in the output power $P_{out}$, with the control device 20 according to the invention, the curve 97 showing a voltage of constant output $V_{out}$ during decrease of output power $P_{out}$.

The reserve current $I_{reserve}$ being, during the transient, greater than the desired value, for example that described above, then the $P_{in}$–$P_{out}$ power imbalance will continue until the reserve current $I_{reserve}$ returns to its desired value.

The reserve current $I_{reserve}$ physically corresponds to a reserve of mechanical energy, the amplitude of the current $I_L$ being an image of the amplitude of the mechanical deformation of the piezoelectric element 15, and therefore of the kinetic and potential energy of the piezoelectric material.

The $I_{reserve}$ reserve voltage forming a reserve buffer energy is determined, in different possible ways:
- on demand: the load 22, such as a powered circuit, sends a signal to the converter 10 to anticipate a demand for current or power. In an example where the circuit consumes little power in standby mode, before waking up the circuit, a request to increase the current $I_L$ is made so as to anticipate the power demand of the circuit when it actually wakes up, and thus avoid a transient drop in its supply voltage, corresponding to the output voltage $V_{out}$ of the converter 10;
- constant: the value of reserve current $I_{reserve}$ is constant and predefined;
- proportional: the value of the reserve current $I_{reserve}$ is proportional to the output current $I_{out}$ or else the useful amplitude $\hat{I}_L$, for example equal to 0.2 times the amplitude $\hat{I}_L$ of the internal current;
- nominal: the internal current $I_L$ is maintained at a certain nominal value regardless of the output current $I_{out}$. This makes it possible to maximize the availability to the detriment of the losses: the higher the current $I_L$, the more there are losses;
- to follow a certain consumption profile of the source 24, as for example in the case of an absorption of a sinusoidal current on the electrical network, or the example of the exploitation of a variable energy source from which we seek to maximize the power extracted at each instant. Source of variable energy is for example an ambient energy harvester, such as radiant energy (solar, infrared, radio frequency), thermal energy, mechanical energy (with vibration, deformation, relative displacement);
- to bring back, to a set value, the time instant $t_{be}$ of the end of the additional phase, or the end the instant of the phase at constant voltage which precedes the additional phase or else the duration of the additional phase, or even any parameter associated with one of the two aforementioned quantities.

For the regulation implemented by the regulation module 62, the quantity $G_{out}$ representative of the output of the converter 10 is for example the output voltage $V_{out}$, the output current $I_{out}$, or the output power $P_{out}$. The first regulation loop 70 then makes it possible to regulate the output voltage $V_{out}$, the output current $I_{out}$, or even the output power $P_{out}$, whereas the second regulation loop 72, slower than the first regulation loop 70 (typically at least ten times slower) allows the energy reserve to be regulated.

The first regulation loop 70 is then configured to maintain the output voltage $V_{out}$, the output current $I_{out}$ or else the output power $P_{out}$ at a set value by acting on the first parameter $\delta_{buffer}$. The first parameter $\delta_{buffer}$ is typically associated with a regulation time instant $t_{regul}$ regulating the duration of the additional phase at substantially constant voltage equal to the value $V_{buffer}$. In the examples of FIGS. 3 and 4, the regulation instant $t_{regul}$ is the temporal instant $t_{be}$ of the end of said additional phase at substantially constant voltage; and in the example of FIG. 5, the regulation instant $t_{regul}$ is the time instant $t_2$ corresponding to the end of the voltage phase substantially constant equal to the value $V_b$.

When the instant of regulation $t_{regul}$ is instant $t_{be}$, as in the examples of FIGS. 3 and 4, the first parameter $\delta_{buffer}$ typically satisfies one of the following equations:

$$\delta_{buffer} = \frac{(t_{be} - t_{bs})}{T} \tag{7}$$

$$\delta_{buffer} = \frac{(t_{be} - t_0)}{T} \tag{8}$$

$$\delta_{buffer} = \frac{t_{be}}{T} \tag{9}$$

$$\delta_{buffer} = t_{be} \tag{10}$$

where T represents the period of the resonance cycle of the piezoelectric element 15, $t_{be}$ and $t_{bs}$ represent the time instants of end and start of the additional phase with substantially constant voltage value equal to value $V_{buffer}$, and $t_0$ represents the first switching time instant corresponding to the passage through zero and through decreasing values of the internal current $I_L$ to the piezoelectric element 15.

When the regulation time instant $t_{regul}$ is the time instant $t_2$, as in for example FIG. 5, the first parameter $\delta_{buffer}$ typically verifies one of the following equations:

$$\delta_{buffer} = \frac{(t_2 - t_1)}{T} \tag{11}$$

$$\delta_{buffer} = \frac{(t_2 - t_0)}{T} \tag{12}$$

$$\delta_{buffer} = \frac{t_2}{T} \tag{13}$$

$$\delta_{buffer} = t_2 \tag{14}$$

where T represents the period of resonance of the piezoelectric element 15, $t_2$ and $t_1$ respectively represent the time instants of end and beginning of the phase during a respective constant equal to the Value $V_b$, and $t_0$ represents the first switching time instant corresponding to the passage through zero and through decreasing values of the internal current $I_L$ to the piezoelectric element 15.

For the first regulation loop 70, the regulation module 62 is then typically configured to compare the quantity $G_{out}$ representative of the output of the converter 10 with its setpoint value $G_{out\_cons}$ via a first comparator 74, or first subtractor, then to act on the first parameter $\delta_{buffer}$ via a first corrector 75 receiving at its input the result of the comparison or subtraction from the first comparator 74, or first subtractor, and delivering at its output the first parameter $\delta_{buffer}$. A time constant of the first loop regulation 70 is typically of the order of a few periods of the electrical energy of the piezoelectric element 15, and for example substantially equal to ten times the period T of said resonance cycle.

As a further optional addition, the regulation module 62 is configured to limit the first parameter $\delta_{buffer}$ between predefined minimum and maximum values, in such a way that the duration of the additional phase at a substantially constant voltage equal at the value $V_{buffer}$, corresponding to the difference $t_{be}$–$t_{bs}$ of the end and start time instants of said phase additional, is always between a zero value and a predefined maximum value. This predefined maximum value is typically less than T/2, i.e. half of the period T of resonance cycle of the piezoelectric element 15.

The second loop regulation 72 makes it possible to carry out the management of the buffer energy, by acting on duration of the energy supply phase via the second parameter $t_4$ corresponding the end of the phase during a respective constant equal to the value $V_a$. The second loop regulation 72 allows in particular to control an imbalance between the power supplied to the piezoelectric element 15 and the power restored, that is to say to control the level of the energy reserve. The energy reserve is determined via a reserve parameter β verifying for example one of the following equations:

$$\beta = \frac{I_{reserve}}{\hat{I}_L} \quad (15)$$

$$\beta = A \quad (16)$$

$$\beta = \delta_{buffer} \quad (17)$$

$$\beta = \hat{I}_L \quad (18)$$

$$\beta = I_{in} \quad (19)$$

where $I_{reserve}$ represents the reserve current, and $\hat{I}_L$ represents the useful amplitude of the internal current, as defined according to equation (6) above, A represents a predefined percentage, such as 1000%, typically representing a ratio between the amount of energy reserve and the amount of energy exchanged during a cycle, and $\delta_{buffer}$ represents the voltage parameter regulation.

$I_{in}$ represents the entry current in converter 10, for example to follow a certain consumption profile at entry.

For the second regulation loop 72, the regulation module 62 is then configured to compare the reserve parameter β with its setpoint value $\beta_{cons}$ via a second comparator 76, or second subtractor, then to act on the second parameter $t_4$ via a second corrector 77 receiving at its input the result of the comparison or subtraction coming from the second comparator 76, or second subtractor, and delivering at its output the second parameter $t_4$. The time constant of the second regulation loop 72 is superior to the time constant of the first regulation loop 70. By way of example, the time constant of the second time regulation loop 72 is substantially equal to ten times the time constant of the first regulation loop 70.

Figure 12:
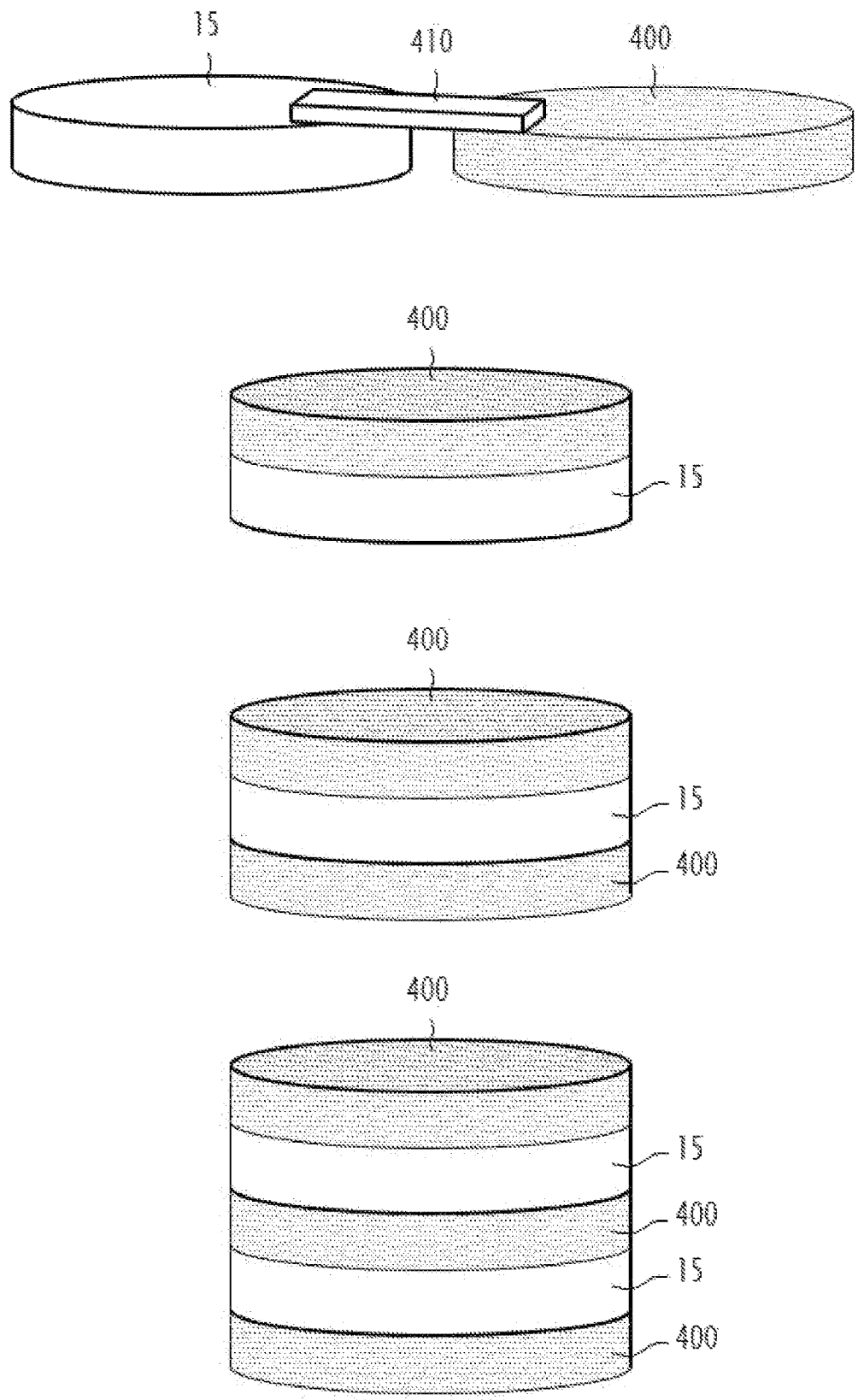
FIG. 12 is a schematic view of examples of mechanical coupling of at least one additional mass with the piezoelectric element, where the at least one additional mass makes it possible to exchange mechanical energy with the piezoelectric element.

As an optional addition, at least one additional mass 400 is mechanically coupled to the piezoelectric element 15, and allows to exchange mechanical energy with the piezoelectric element 15, as shown in FIG. 12.

According to this optional addition, when the electrical energy supplied to the piezoelectric element 15 is greater than that which it restores in electrical form or in heat dissipation, then the piezoelectric element 15 causes the additional mass, and stores via this the mechanical energy in the form of mechanical oscillations. Conversely, when the piezoelectric element 15 receives less energy than it restores in electrical or thermal form, then the additional mass tends to maintain the oscillation of the piezoelectric element 15.

According to this optional addition, the additional mass then behaves like a second reservoir of mechanical energy with which the piezoelectric element 15 can exchange via a mechanical coupling, such as bonding, clamping, a mechanical arm, etc. Another advantage is then to replace a capacitor (chemical, ceramic) by the additional mass.

FIG. 12 then illustrates various examples of mechanical coupling of the at least one additional mass 400 with the piezoelectric element 15.

According to a first example, represented in the upper part of FIG. 12, the piezoelectric element 15 is mechanically coupled with the additional mass 400 via a mechanical arm 410. The piezoelectric element 15 and the additional mass 400 are, for example, arranged one aside the other.

According to a second example, represented below the first example in FIG. 12, the piezoelectric element 15 and the additional masses 400 are superposed, that is to say are arranged one above the other, or still are stacked. According to this second example, the piezoelectric element 15 and the additional mass 400 are mechanically coupled, typically by gluing or clamping.

According to a third example, represented below the second example in FIG. 12, the piezoelectric element 15 is coupled to several additional masses 400.

According to the third example, the piezoelectric element 15 is sandwiched between two additional masses 400. The piezoelectric element 15 and the additional masses 400 are then superposed, or even stacked, with an additional mass 400 below the piezoelectric element 15 and the other additional mass 400 above the piezoelectric element 15. According to this third example, the piezoelectric element 15 and the additional masses 400 are mechanically coupled, typically by gluing or clamping.

According to a fourth example, represented below the third example and at the bottom of FIG. 12, several piezoelectric elements 15 are mechanically coupled with several additional masses 400. According to this example, the piezoelectric element 15 and the additional masses 400 are mechanically coupled, by bonding or clamping typically.

In this fourth example, two piezoelectric elements 15 are mechanically coupled with three additional masses 400, in the form of a stack with an alternation of piezoelectric element 15 and additional mass 400. In this example, a first additional mass 400 is placed under a first piezoelectric element 15, itself placed under a second additional mass 400, itself placed under a second piezoelectric element 15, finally itself placed under a third additional mass 400.

Figure 9:
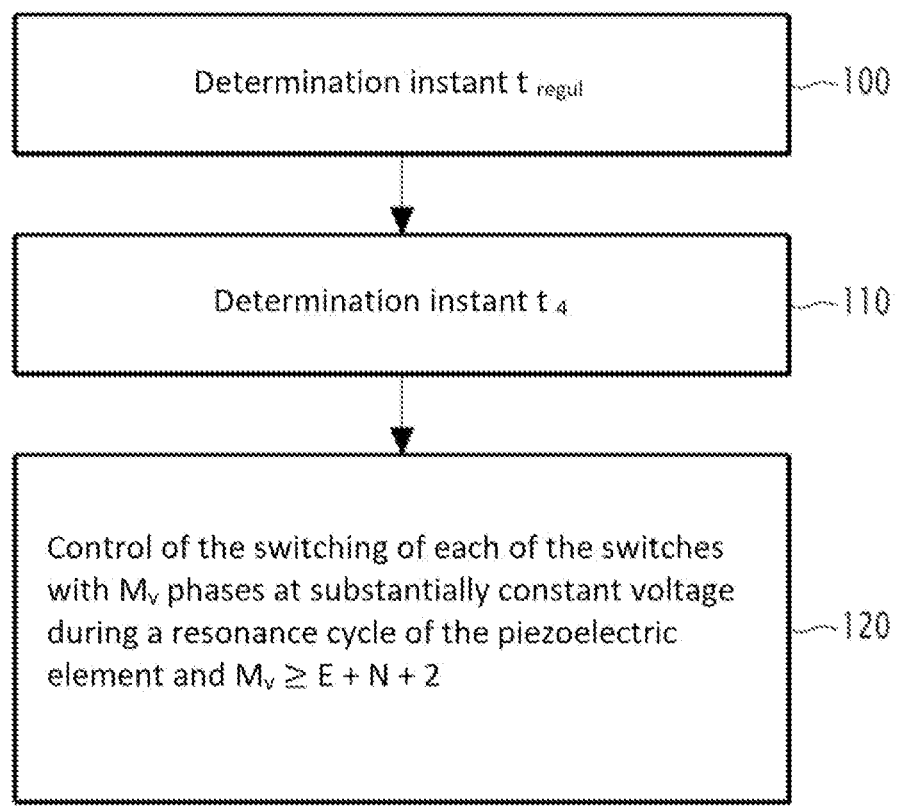
FIG. 9 is a flowchart of a method, according to the invention, for controlling the electrical energy converter of FIG. 1, with the method implemented by the electronic control device of FIG. 1.

The operation of the electrical energy converter 10, and in particular of the electronic control device 20, will now be described according to the invention with reference to FIG. 9 representing a flowchart of a method, according to the invention, of piloting of the electrical energy converter 10, the method being implemented by the electronic control device 20.

During a step 100, the control device 20 determines, via its regulation module 62, the regulation time instant $t_{regul}$ as a function of the quantity $G_{out}$ representative of the output of the converter 10. During this first determination step 100, the regulation module 62 typically determines this regulation instant $t_{regul}$ via the first regulation loop 70.

During the next step 110, the control device 20 determines, via its regulation module 62, the time instant $t_4$ corresponding to the second regulation parameter according to the desired level of energy reserve or else according to the first parameter $\delta_{buffer}$. During this second determination step 110, the regulation module 62 typically determines this time instant $t_4$ via the second regulation loop 72.

At the end of the first and second determination steps 100, 110 and the associated determination of the time instants $t_{regul}$ and $t_4$ corresponding to the two degrees of freedom of the regulation of the converter 10, the control device 20 passes to the next step 120 during which it controls, via its control module 60, the switching of each of the switches $K_1$ to $K_5$ of the converter 10 to alternate phases at substantially constant voltage at the terminals 30, 34 of the piezoelectric element 15 and of the phases at substantially constant charge at terminals 30, 34 of said piezoelectric element 15.

During this control step 120, according to the invention, the number $M_V$ of phases at substantially constant voltage, such as phases II, IV, VI, VIII, during a respective resonance cycle of the piezoelectric element 15 is greater than or equal to the sum of the number E of distinct input voltage(s), the number N of distinct output voltage(s) and two, this number $M_V$ satisfying the former equation (1). In addition, each of the first and second half-cycles comprises at least two substantially constant voltage phases. In the example of FIGS. 3 to 5, the first half-cycle thus comprises phases II, IV at substantially constant voltage, and the second half-cycle comprises phases VI, VIII at substantially constant voltage.

Figure 10:
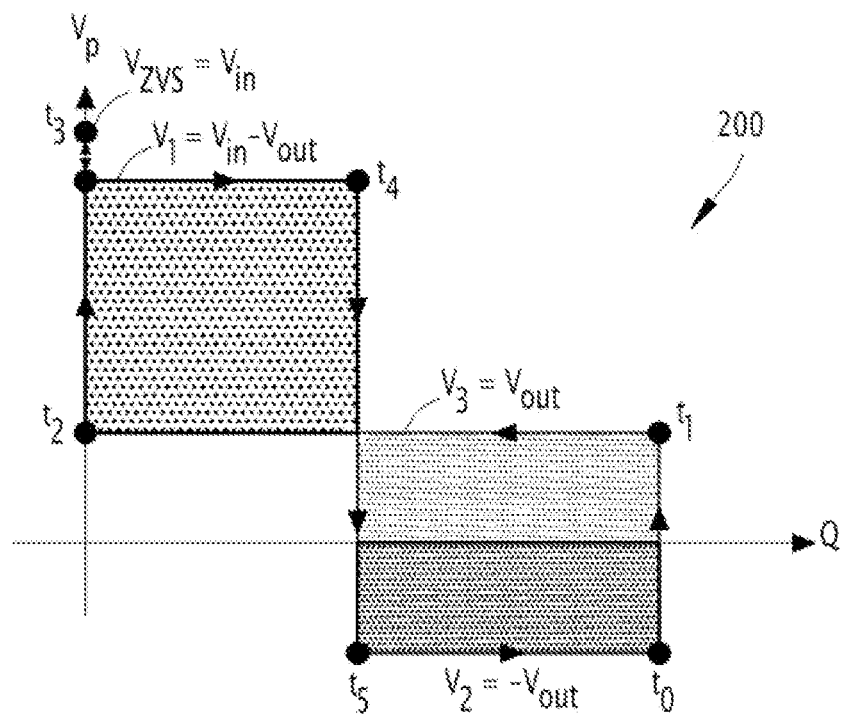
FIG. 10 is a view representing, on the one hand, a first cycle of conversion into representation $V_p$ versus Q obtained with the control device of the state of the art, and on the other hand, a second cycle of conversion with representation $V_p$ versus Q obtained with the control device according to the invention.
Figure 10:
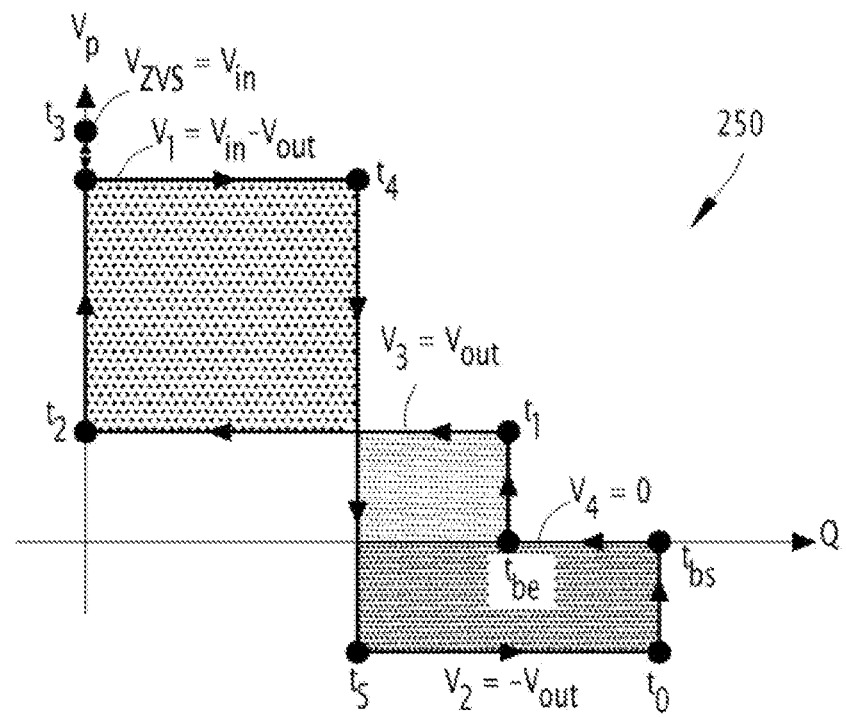

FIG. 10 representing, on the one hand, a first conversion cycle 200 into $V_p$ versus Q representation obtained with the prior art control device, and on the other hand, a second conversion cycle 250 into $V_p$ representation versus Q obtained with the control device 20 according to the invention, in particular for the examples of FIGS. 3 and 4, then makes it possible to show the difference in terms of degree of freedom for the regulation of the electrical energy converter 10 between the device control in the state of the art and the control device 20 according to the invention. Indeed, the first conversion cycle 200 in representation $V_p$ versus Q shows a single degree of freedom for regulation of the converter 10, this single degree of freedom corresponds to the time instant $t_4$; whereas the second conversion cycle 250 in representation $V_p$ versus Q shows the two degrees of freedom for regulating the converter 10 with the control device 20 according to the invention, a first degree of freedom corresponding to time instant $t_4$, as for the control device of the state of the art, and a second degree of freedom corresponding to time instant $t_{be}$. This second degree of freedom then forms an additional degree of freedom for the regulation of the electrical energy converter 10 with respect to the control method in the state of the art.

Figure 11:
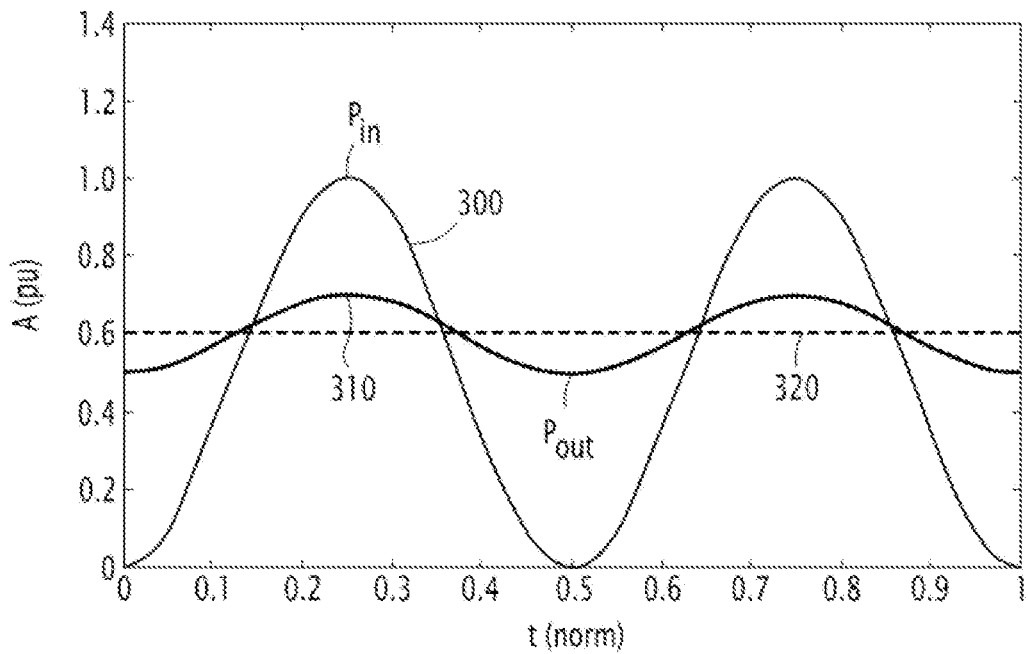
FIG. 11 is a view of input power and output power curves in the case of a sinusoidal absorption AC-DC type conversion system with, on the one hand, a first set of such power curves obtained with the control device of the state of the art, and on the other hand, a second set of such power curves obtained with the control device according to the invention.
Figure 11:
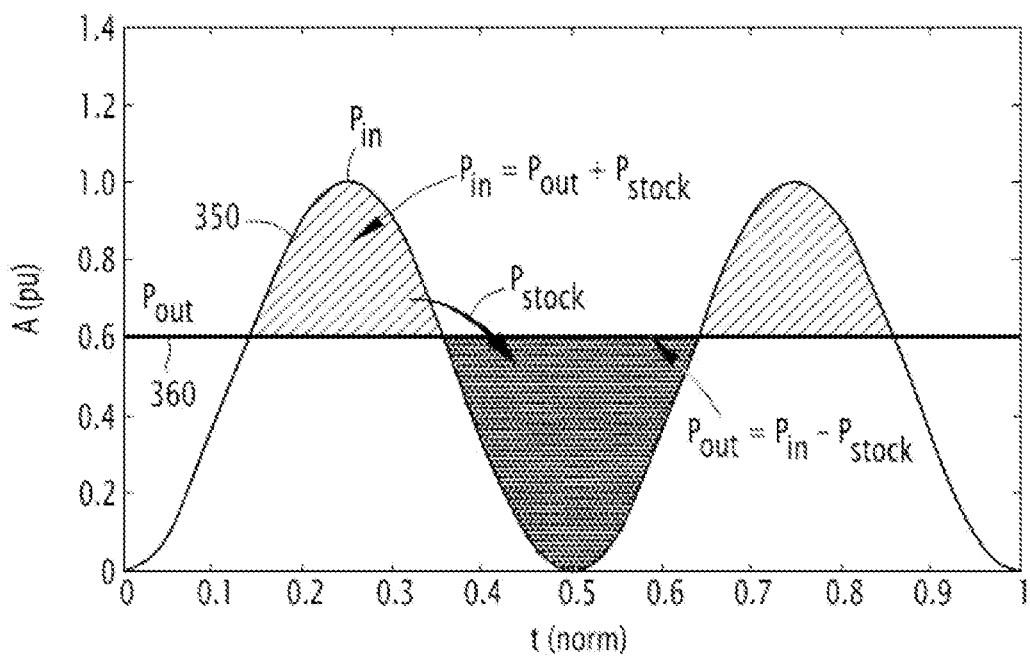

In FIG. 11 representing input power curves $P_{in}$ and output $P_{out}$ in the case where the conversion system 5 is of the AC-DC type with sinusoidal absorption, a first input power curve 300 and a first output power curve 310 correspond respectively to the input power $P_{in}$ and output power $P_{out}$ obtained with the control device of the state of the art, the line 320 in dotted line representing the average value of the output power $P_{out}$; and a second input power curve 350 and a second output power curve 360 correspond respectively to the input power $P_{in}$ and output power $P_{out}$ obtained with the control device 20 according to the invention.

Those skilled in the art will then observe that the output power $P_{out}$ obtained with the control device of the state of the art comprises oscillations, visible on the first output power curve 310, and that it is then generally necessary to add a potentially bulky filtering capacitor, as well as a power booster (Boost) of the PFC type (Power Factor Corrector), to ensure a sinusoidal current draw in phase with the network voltage.

For such an application where the conversion system 5 is of the AC-DC type with sinusoidal absorption, the control device 20 according to the invention then makes it possible to store part of the energy taken from the source in the piezoelectric element 15 when the input power $P_{in}$ is higher than the output power $P_{out}$, the stored power being denoted $P_{stock}$ at FIG. 11, and then to restore this stored power $P_{stock}$ at the output when the input power $P_{in}$ is lower than the output power $P_{output}$. This then makes it possible to supply a substantially constant output power $P_{out}$ as shown by the second output power curve 360 in the form of a straight line, whereas the power taken from the network is sinusoidal. The control device 20 according to the invention then makes it possible to reduce, or even eliminate, the aforementioned filtering capacitor.

It is thus conceivable that the electronic control device 20 and the associated control method make it possible to offer improved control of the electrical energy converter 10, in particular better regulation of said converter 10.

The invention claimed is:

1. An electronic control device for controlling an electrical energy converter capable of converting one or several input voltages into one or several output voltages, the electrical energy converter being configured to deliver N distinct output voltage(s) from E distinct input voltage(s), E and N each being an integer greater than or equal to 1, the electrical energy converter comprising a piezoelectric element and several switches, the electronic control device comprising a control module configured to control, during a respective resonance cycle of the piezoelectric element, switching of each of the several switches so as to alternate phases at substantially constant voltage at terminals of the piezoelectric element and phases at a substantially constant charge at the terminals of the piezoelectric element, each resonance cycle comprising first and second half-cycles, a current flowing in a first direction in the piezoelectric element during the first half-cycle and in a second direction, opposite to the first direction, during the second half-cycle, wherein a number of the phases at the substantially constant voltage during a respective resonance cycle is greater than or equal to a sum of E, N and two, and each of the first and second half-cycles comprises at least two of the phases at the substantially constant voltage, and wherein a value of a voltage of one of the phases at the substantially constant voltage during the first half-cycle is substantially equal to a value of the voltage of one of the phases at the substantially constant voltage during the second half-cycle.

2. The device according to claim 1, wherein the number of the phases at the substantially constant voltage during a respective resonance cycle is equal to the sum of E, N and two.

3. The device according to claim 1, wherein a total number of the phases at the substantially constant voltage and of the phases at the substantially constant charge during a respective resonance cycle is greater than or equal to four plus twice a sum of E and N.

4. The device according to claim 1, wherein the phases at the substantially constant voltage having substantially the same voltage value during a first one of the resonance cycles and during a second one of the resonance cycles are one after the other.

5. The device according to claim 4, wherein the phases at the substantially constant voltage having the substantially the same voltage value during the first cycle and during the second cycle form a same phase at the substantially constant voltage extending over two successive half-cycles.

6. The device according to claim 1, wherein a value of the voltage of each of the phases at the substantially constant voltage is chosen from a group consisting of: null value; value of a respective input voltage; opposite of the value of a respective input voltage; value of a respective output voltage; opposite of the value of a respective output voltage; and linear combination of the aforementioned values.

7. The device according to claim 1, wherein the device further comprises a regulation module configured to regulate a first parameter associated with the first half-cycle and a second parameter associated in the second half-cycle, each of the first and second parameters being a variable representing a time instant of an end of a respective phase at the substantially constant voltage.

8. The device according to claim 7, wherein the first parameter is regulated as a function of a quantity representative of the output of the electrical energy converter, and the second parameter is regulated according to a desired level of energy reserve or else according to the first parameter.

9. The device according to claim 7, wherein the first parameter is regulated via a first regulation loop, and the second parameter is regulated via a second regulation loop, distinct from the first regulation loop.

10. The device according to claim 9, wherein the first regulation loop is faster than the second regulation loop.

11. An electronic system configured to convert electrical energy comprising:

an electrical energy converter comprising a piezoelectric element and several switches capable of being controlled to alternate phases at a substantially constant voltage at terminals of the piezoelectric element and phases at a substantially constant charge across the terminals of the piezoelectric element; and the electronic control device according to claim 1 for controlling the electrical energy converter.

12. The system according to claim 11, wherein the electronic system configured to convert electrical energy comprises a system for converting into a DC energy.

13. The system according to claim 12, wherein the electronic system configured to convert electrical energy is a DC-DC conversion system.

14. The system according to claim 12, wherein the electronic system configured to convert electrical energy is an AC-DC conversion system.

15. A method for controlling an electrical energy converter capable of converting an input voltage into an output voltage, the electrical energy converter being configured to deliver N distinct output voltage(s) from E distinct input voltage(s), E and N each being an integer greater than or equal to 1, the electrical energy converter comprising a piezoelectric element and several switches, the method being implemented by an electronic control device and comprising controlling, during a respective resonance cycle of the piezoelectric element, a switching of each of the several switches to alternate phases at a substantially constant voltage across terminals of the piezoelectric element and phases at a substantially constant charge at the terminals of the piezoelectric element, each resonance cycle comprising first and second half-cycles, a current flowing in a first direction in the piezoelectric element during the first half-cycle and in a second direction, opposite to the first direction, during the second half-cycle, wherein a number of phases at the substantially constant voltage during a respective resonance cycle is greater than or equal to the sum of E, N and two, and each of the first and second half-cycles comprises at least two phases at the substantially constant voltage, and wherein a value of a voltage of one of the phases at the substantially constant voltage during the first half-cycle is substantially equal to a value of a voltage of one of the phases at the substantially constant voltage during the second half-cycle.

* * * * *